(12) United States Patent
Ying et al.

(10) Patent No.: US 11,327,914 B1
(45) Date of Patent: May 10, 2022

(54) C-PHY DATA-TRIGGERED EDGE GENERATION WITH INTRINSIC HALF-RATE OPERATION

(71) Applicant: QUALCOMM Incorporated, San Diego, CA (US)

(72) Inventors: Da Ying, San Diego, CA (US); Shih-Wei Chou, San Diego, CA (US); Ying Duan, San Diego, CA (US); Abhay Dixit, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/162,497

(22) Filed: Jan. 29, 2021

(51) Int. Cl.
*G06F 13/20* (2006.01)
*G06F 1/04* (2006.01)
*G06F 13/42* (2006.01)
*H04L 7/00* (2006.01)

(52) U.S. Cl.
CPC ............... *G06F 13/20* (2013.01); *G06F 1/04* (2013.01); *G06F 13/4291* (2013.01); *H04L 7/0087* (2013.01)

(58) Field of Classification Search
CPC ........ G06F 13/20; G06F 1/04; G06F 13/4291; H04L 7/0087
See application file for complete search history.

(56) References Cited

U.S. PATENT DOCUMENTS

| | | | | |
|---|---|---|---|---|
| 9,485,080 B1* | 11/2016 | Duan | ................... | H04L 25/0272 |
| 10,298,381 B1* | 5/2019 | Lee | ......................... | H04L 7/0334 |
| 2018/0019863 A1* | 1/2018 | Liao | ......................... | H04L 7/04 |
| 2021/0091922 A1* | 3/2021 | Kim | ....................... | H03G 3/3036 |

OTHER PUBLICATIONS

Takla, Ashraf; "Demystifying MIPI C-PHY/D-PHY Subsystem: Tradeoffs, Challenges, and Adoption"; Mixel, Inc.; accessed at URL <https://mixel.com/demystifying-mipi-c-phy-d-phy-subsystem/>; Apr. 9, 2018 (Year: 2018).*

MIPI C-PHY; MIPI Alliance webpage accessed at URL <https://www.mipi.org/specifications/c-phy. (Year: 2022).*

* cited by examiner

*Primary Examiner* — Glenn A. Auve
(74) *Attorney, Agent, or Firm* — Loza & Loza, LLP

(57) ABSTRACT

Methods, apparatus, and systems for clock and data recovery in a C-PHY interface are disclosed. A receiving device has a plurality of differential receivers and a recovery circuit. The differential receivers are configured to generate difference signals. Each difference signal is representative of voltage difference between one pair of wires in a three-wire serial bus. The recovery circuit is configured to identify a first difference signal that has the greatest voltage magnitude among the plurality of difference signals in a first unit interval and determine signaling state of the three-wire serial bus for the first unit interval based on identity of the pair of wires corresponding to the first difference signal and polarity of the first difference signal in the first unit interval, and to generate a first edge in a clock signal responsive to a transition in the first difference signal during the first unit interval.

30 Claims, 19 Drawing Sheets

C-PHY DATA-TRIGGERED EDGE GENERATION WITH INTRINSIC HALF-RATE OPERATION

TECHNICAL FIELD

The present disclosure relates generally to high-speed data communication interfaces, and more particularly, to improving clock recovery in a receiver.

BACKGROUND

Manufacturers of mobile devices, such as cellular phones, may obtain components of the mobile devices from various sources, including different manufacturers. For example, an application processor in a cellular phone may be obtained from a first manufacturer, while an imaging device or camera may be obtained from a second manufacturer, and a display may be obtained from a third manufacturer. The application processor, the imaging device, the display controller, or other types of device may be interconnected using a standards-based or proprietary physical interface. In one example, an imaging device may be connected using the Camera Serial Interface (CSI) defined by the Mobile Industry Processor Interface (MIPI) Alliance. In another example, a display may include an interface that conforms to the Display Serial Interface (DSI) standard specified by the Mobile Industry Processor Interface (MIPI) Alliance.

The C-PHY interface is a multiphase three-wire interface defined by the MIPI Alliance that uses a trio of conductors to transmit information between devices. Each wire in the trio may be in one of three signaling states during transmission of a symbol. Clock information is encoded in the sequence of transmitted symbols and a receiver generates a clock signal from transitions between consecutive symbols. The ability of a clock and data recovery (CDR) circuit to recover clock information may be limited by the maximum time variation related to transitions of signals transmitted on the different wires of the communication link. The CDR circuit in a C-PHY receiver may employ a mask that is intended to block all but the first transition detection between consecutively transmitted symbols. Variations in the timing of the first transition can limit the maximum data throughput through the C-PHY interface by causing jitter in the received clock and by necessitating the use of a mask that significantly reduces the sampling window used to capture symbols at the receiver. For these and other reasons, there is an ongoing need for optimized clock generation circuits that can function reliably at ever-higher signaling frequencies.

SUMMARY

Embodiments disclosed herein provide systems, methods and apparatus that enable improved communication on a multi-wire and/or multiphase communication link. The communication link may be deployed in apparatus such as a mobile terminal having multiple Integrated Circuit (IC) devices. Certain techniques disclosed herein can improve the recovery of clock information and can more reliably capture wire state at higher data rates. In one aspect, jitter can be reduced by generating edges in a receive clock and determining wire state based on the output of one of three differential receivers.

In various aspects of the disclosure, a method of data communications includes generating a plurality of difference signals, each difference signal representative of voltage difference between one pair of wires in a three-wire serial bus, identifying a first difference signal of the plurality of difference signals that has greatest voltage magnitude among the plurality of difference signals in a first unit interval, determining signaling state of the three-wire serial bus for the first unit interval based on identity of the pair of wires corresponding to the first difference signal and polarity of the first difference signal in the first unit interval and generating a first edge in a clock signal responsive to a transition in the first difference signal during the first unit interval.

In various aspects of the disclosure, an apparatus for data communication has a plurality of differential receivers configured to generate a plurality of difference signals, each difference signal representative of voltage difference between one pair of wires in a three-wire serial bus, and a recovery circuit. The recovery circuit is configured to identify a first difference signal that has greatest voltage magnitude among the plurality of difference signals in a first unit interval, determine signaling state of the three-wire serial bus for the first unit interval based on identity of the pair of wires corresponding to the first difference signal and polarity of the first difference signal in the first unit interval, and generate a first edge in a clock signal responsive to a transition in the first difference signal during the first unit interval.

In various aspects of the disclosure, a non-transitory processor readable storage medium, includes code for generating a plurality of difference signals, each difference signal representative of voltage difference between one pair of wires in a three-wire serial bus, identifying a first difference signal of the plurality of difference signals that has greatest voltage magnitude among the plurality of difference signals in a first unit interval, determining signaling state of the three-wire serial bus for the first unit interval based on identity of the pair of wires corresponding to the first difference signal and polarity of the first difference signal in the first unit interval and generating a first edge in a clock signal responsive to a transition in the first difference signal during the first unit interval.

In various aspects of the disclosure, a non-transitory processor readable storage medium that maintains code for generating a plurality of difference signals, each difference signal representative of voltage difference between one pair of wires in a three-wire serial bus, identifying a first difference signal of the plurality of difference signals that has greatest voltage magnitude among the plurality of difference signals in a first unit interval, determining signaling state of the three-wire serial bus for the first unit interval based on identity of the pair of wires corresponding to the first difference signal and polarity of the first difference signal in the first unit interval and generating a first edge in a clock signal responsive to a transition in the first difference signal during the first unit interval.

DETAILED DESCRIPTION

Figure 1:
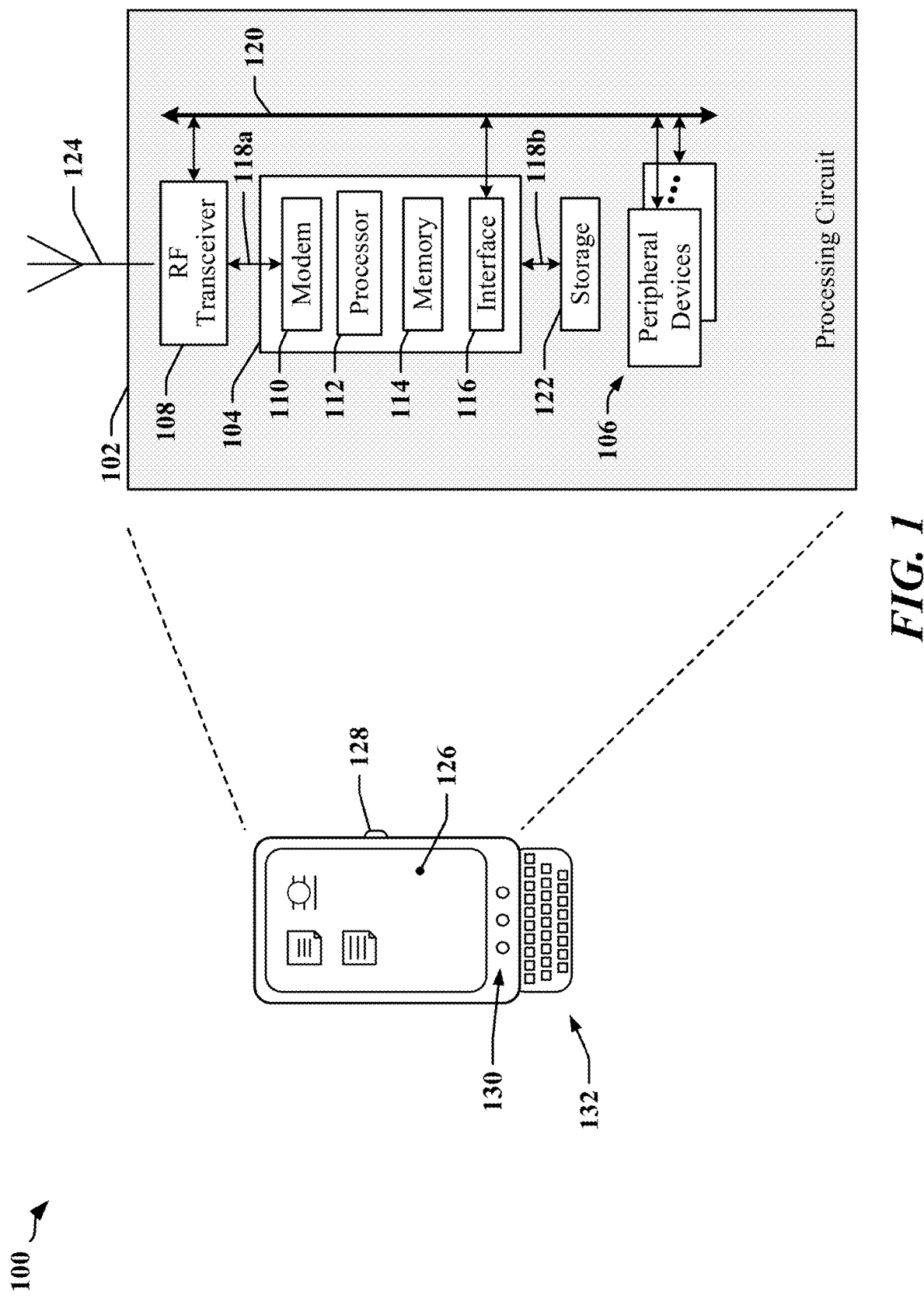
FIG. 1 depicts an apparatus employing a data link between IC devices that is selectively operated according to one of a plurality of available standards or protocols, which may include a C-PHY protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

Certain aspects of the invention may be applicable to a C-PHY interface specified by the MIPI Alliance, which may be deployed to connect electronic devices that are subcomponents of a mobile apparatus such as a telephone, a mobile computing device, an appliance, automobile electronics, avionics systems, etc. Examples of a mobile apparatus include a mobile computing device, a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, avionics systems, a wearable computing device (e.g., a smartwatch, a health or fitness tracker, eyewear, etc.), an appliance, a sensor, a security device, a vending machine, a smart meter, a drone, a multicopter, or any other similarly functioning device.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted over a set of three wires, which may be referred to as a trio, or trio of wires. For each symbol transmission interval, a three-phase signal is transmitted in different phases on the wires of the trio, where the phase of the three-phase signal on each wire is defined by a symbol transmitted in the symbol transmission interval. Each trio provides a lane on a communication link. A symbol transmission interval may be defined as the interval of time in which a single symbol controls the signaling state of a trio. In each symbol transmission interval, one wire of the trio is undriven, while the remaining two wires are differentially driven such that one of the two differentially driven wires assumes a first voltage level and the other differentially driven wire assumes to a second voltage level different from the first voltage level. The undriven wire may float, be driven, and/or be terminated such that it assumes a third voltage level that is at or near the mid-level voltage between the first and second voltage levels. In one example, the driven voltage levels may be +V and −V with the undriven voltage being 0 V. In another example, the driven voltage levels may be +V and 0 V with the undriven voltage being +½V. Different symbols are transmitted in each consecutively transmitted pair of symbols, and different pairs of wires may be differentially driven in different symbol intervals.

Certain aspects disclosed herein provide methods and apparatus for recovering clock and data from a serial bus operated in accordance with a C-PHY protocol. Difference signals representative of voltage difference between one pair of wires in a three-wire serial bus are generated and provided to level detector circuits. A first difference signal that has the highest magnitude represents the strongest difference in voltage between two wires of the three-wire serial bus in a first unit interval. The signaling state of the three-wire serial bus in the first unit interval can be determined based on the identity of the pair of wires corresponding to the first difference signal and the polarity of the first difference signal in the first unit interval. A first edge may be generated in a receive clock signal responsive to a transition in the first difference signal during the first unit interval.

Example of an Apparatus Employing a C-PHY Interface

FIG. 1 depicts an example of apparatus 100 that may be adapted in accordance with certain aspects disclosed herein. The apparatus 100 may employ C-PHY 3-phase protocols to implement one or more communication links. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processor 112 provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or processor-readable storage 122 provided on the processing circuit 102. The software modules may include instructions and data stored in the on-board memory 114 or other processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
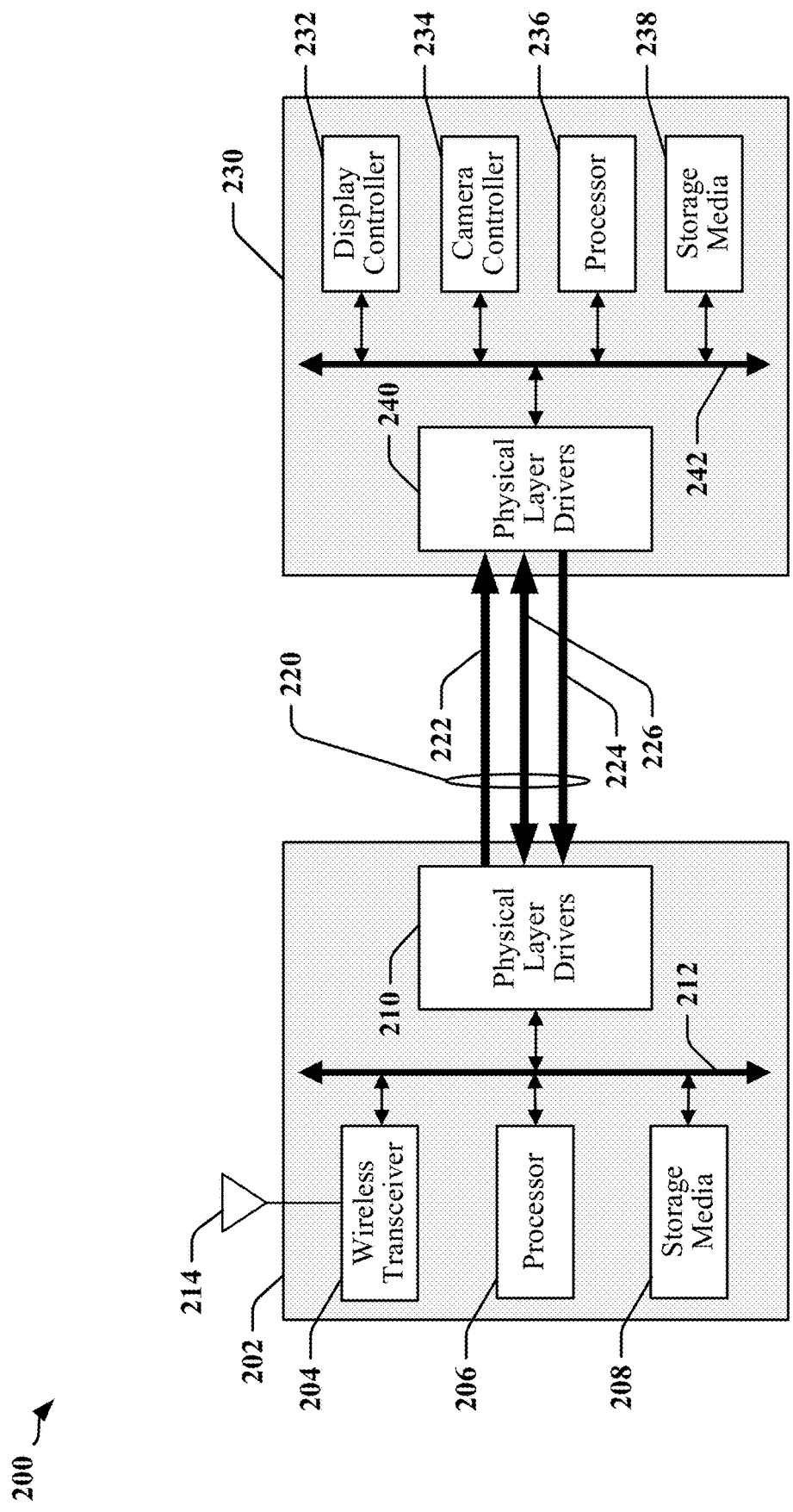
FIG. 2 illustrates a system architecture for an apparatus employing a data link between IC devices that selectively operates according to one of plurality of available standards.

FIG. 2 illustrates certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first channel 222 may be referred to as a forward channel 222 while a second channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor 206, 236, controller or other processing and/or computing circuit or device. In one example, the first IC device 202 may perform core functions of the apparatus 200, including establishing and maintaining wireless communication through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal buses 212 and 242 and/or a channel 222, 224 and/or 226 of the communication link 220.

The reverse channel 224 may be operated in the same manner as the forward channel 222, and the forward channel 222, and the reverse channel 224 may be capable of transmitting at comparable speeds or at different speeds, where speed may be expressed as data transfer rate, symbol transmission rate and/or clocking rates. The forward and reverse data rates may be substantially the same or may differ by orders of magnitude, depending on the application. In some applications, a single bidirectional channel 226 may support communication between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

The physical layer drivers 210 and 240 can typically encode multiple bits per transition on the communication link 220 when configured for N-phase polarity encoding. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
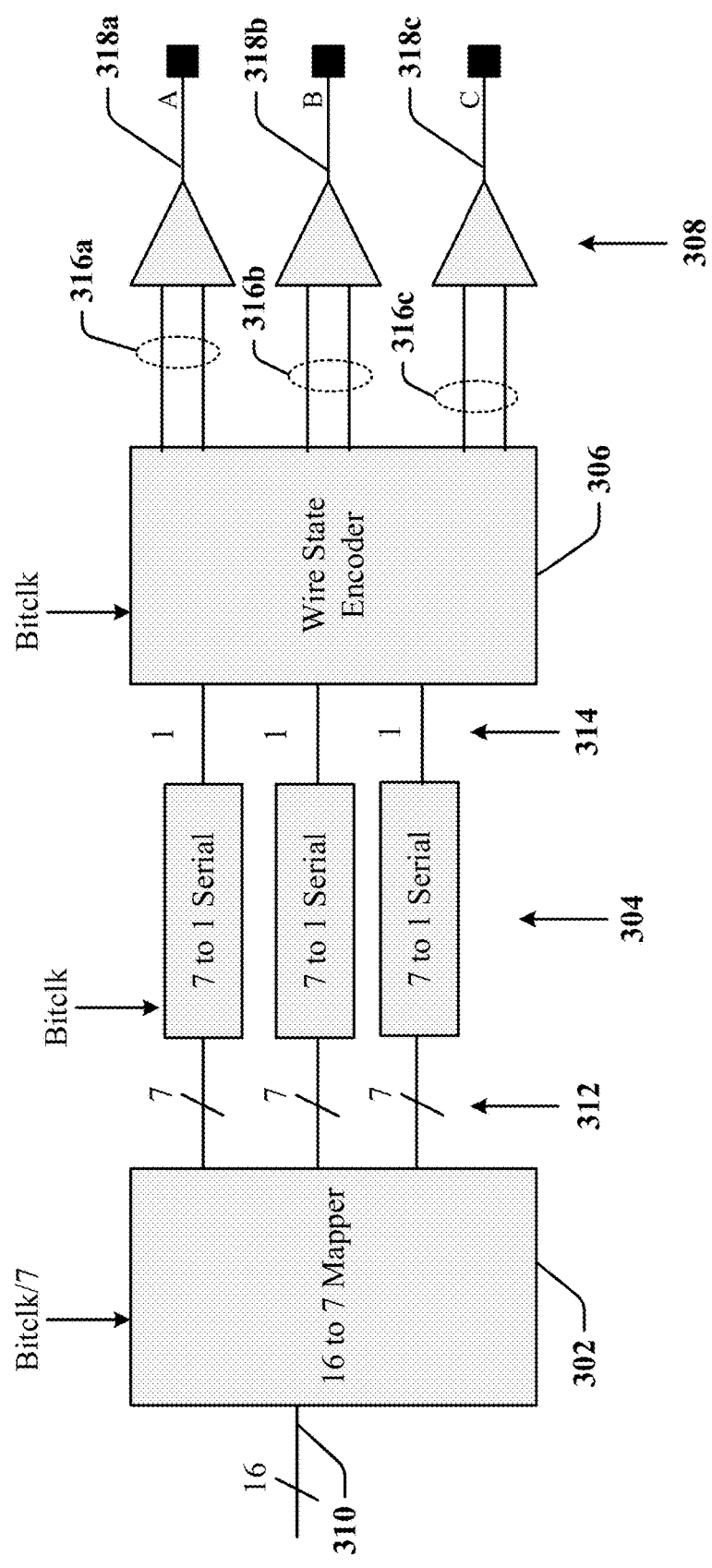
FIG. 3 illustrates a C-PHY 3-phase transmitter.

FIG. 3 is a diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the 3 wires in a 3-wire, 3-phase polarity encoding scheme may include an undriven state, a positively driven state and a negatively driven state. The positively driven state and the negatively driven state may be obtained by providing a voltage differential between two of the signal wires 318a, 318b and/or 318c, and/or by driving a current through two of the signal wires 318a, 318b and/or 318c connected in series such that the current flows in different directions in the two signal wires 318a, 318b and/or 318c. The undriven state may be realized by placing an output of a driver of a signal wire 318a, 318b or 318c in a high-impedance mode. Alternatively, or additionally, an undriven state may be obtained on a signal wire 318a, 318b or 318c by passively or actively causing an "undriven" signal wire 318a, 318b or 318c to attain a voltage level that lies substantially halfway between positive and negative voltage levels provided on driven signal wires 318a, 318b and/or 318c. Typically, there is no significant current flow through an undriven signal wire 318a, 318b or 318c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of signal wires 318a, 318b and 318c. The line drivers 308 may be implemented as unit-level current-mode or voltage-mode drivers. In some implementations, each line driver 308 may receive sets of signals 316a, 316b and 316c that determine the output state of corresponding signal wires 318a, 318b and 318c. In one example, each of the sets of signals 316a, 316b and 316c may include two or more signals, including a pull-up signal (PU signal) and a pull-down signal (PD signal) that, when high, activate pull-up and pull down circuits that drive the signal wires 318a, 318b and 318c toward a higher level or lower level voltage, respectively. In this example, when both the PU signal and the PD signal are low, the signal wires 318a, 318b and 318c may be terminated to a mid-level voltage.

For each transmitted symbol interval in an M-wire, N-phase polarity encoding scheme, at least one signal wire 318a, 318b or 318c is in the midlevel/undriven (0) voltage or current state, while the number of positively driven (+1 voltage or current state) signal wires 318a, 318b or 318c is equal to the number of negatively driven (−1 voltage or current state) signal wires 318a, 318b or 318c, such that the sum of current flowing to the receiver is always zero. For each symbol, the signaling state of at least one signal wire 318a, 318b or 318c is changed from the wire state transmitted in the preceding transmission interval.

In operation, a mapper 302 may receive and map 16-bit data 310 to 7 symbols 312. In the 3-wire example, each of the 7 symbols defines the states of the signal wires 318a, 318b and 318c for one symbol interval. The 7 symbols 312 may be serialized using parallel-to-serial converters 304 that provide a timed sequence of symbols 314 for each signal wire 318a, 318b and 318c. The sequence of symbols 314 is typically timed using a transmission clock. A 3-wire, 3-phase encoder 306 receives the sequence of 7 symbols 314 produced by the mapper one symbol at a time and computes the state of each signal wire 318a, 318b and 318c for each symbol interval. The 3-wire, 3-phase encoder 306 selects the states of the signal wires 318a, 318b and 318c based on the current input symbol 314 and the previous states of signal wires 318a, 318b and 318c.

The use of M-wire, N-phase encoding permits a number of bits to be encoded in a plurality of symbols where the bits per symbol is not an integer. In the example of a 3-wire communication link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5) \approx 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
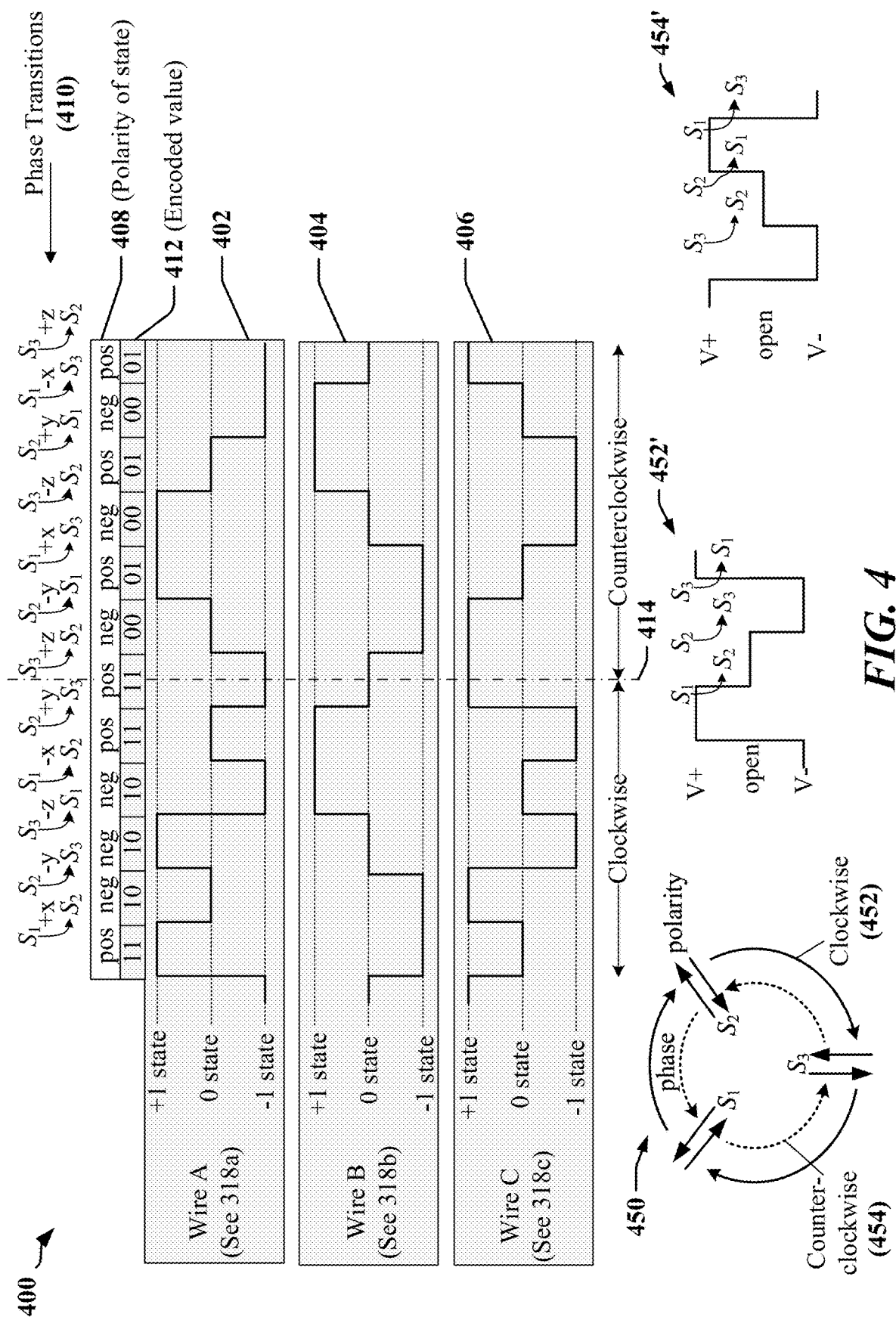
FIG. 4 illustrates signaling in a C-PHY 3-phase encoded interface.

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the circular state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 452' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$, from $S_3$ to $S_2$ and from $S_2$ to $S_1$. The three signal wires 318a, 318b and 318c carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 318a, 318b and 318c is in a different signaling states than the other wires. When more than 3 signal wires 318a, 318b and 318c are used in a 3-phase encoding system, two or more signal wires 318a, 318b and/or 318c can be in the same signaling state at each signaling interval, although each state is present on at least one signal wire 318a, 318b and/or 318c in every signaling interval.

Information may be encoded in the direction of rotation at each phase transition 410, and the 3-phase signal may change direction for each signaling state. Direction of rotation may be determined by considering which signal wires 318a, 318b and/or 318c are in the '0' state before and after a phase transition, because the undriven signal wire 318a, 318b and/or 318c changes at every signaling state in a rotating three-phase signal, regardless of the direction of rotation.

The encoding scheme may also encode information in the polarity 408 of the two signal wires 318a, 318b and/or 318c that are actively driven. At any time in a 3-wire implementation, exactly two of the signal wires 318a, 318b, 318c are driven with currents in opposite directions and/or with a voltage differential. In one implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three signal wires 318a, 318b and 318c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state, and there may be $\log_2(5) \approx 2.32$ bits encoded per symbol (transition), which allows the mapper 302 to accept a 16-bit word and encode it in 7 symbols.

Figure 5:
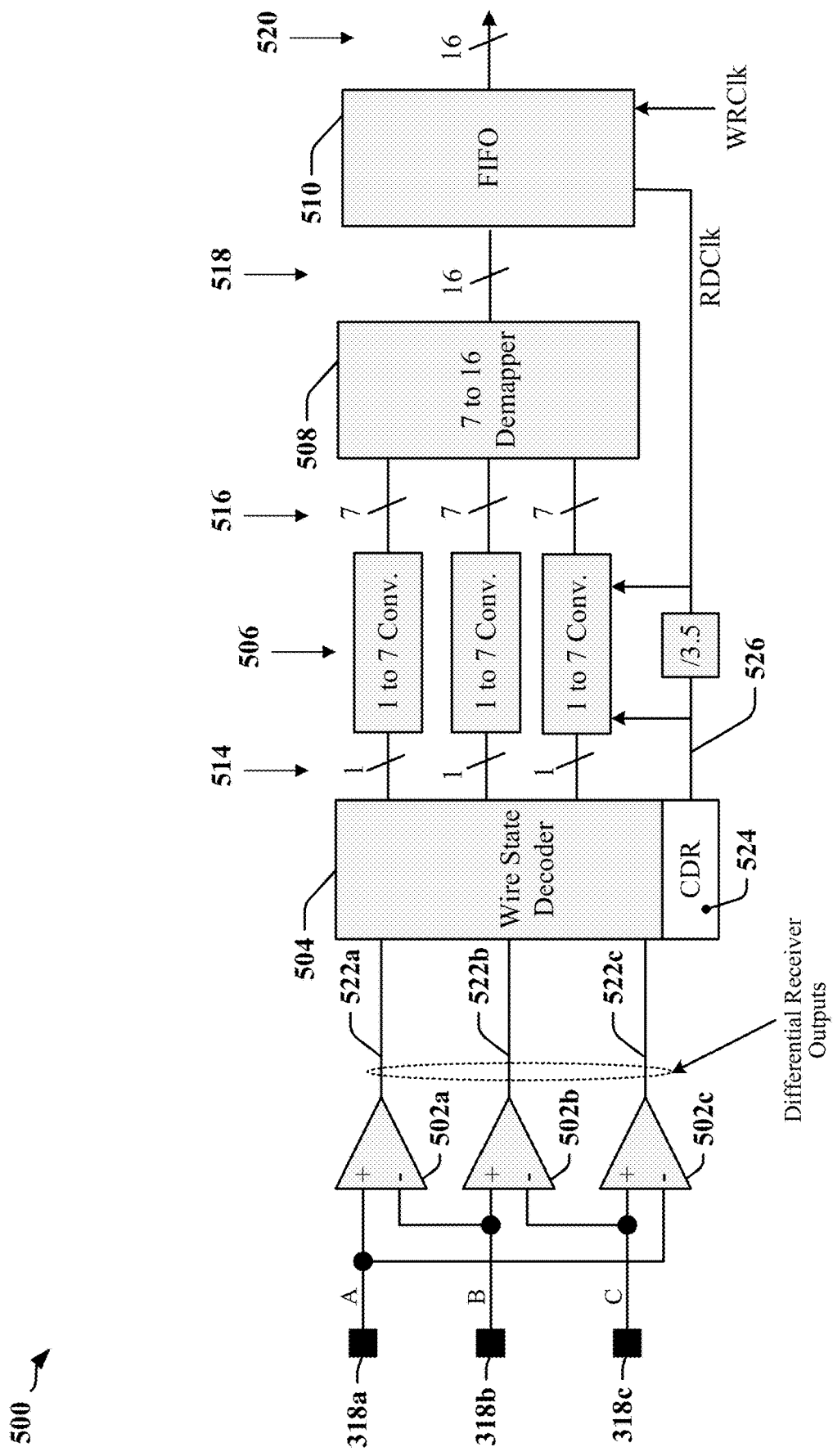
FIG. 5 illustrates a C-PHY 3-phase receiver.

FIG. 5 is a diagram illustrating certain aspects of a 3-wire, 3-phase decoder 500. Differential receivers 502a, 502b, 502c and a wire state decoder 504 are configured to provide difference signals 522a, 522b, 522c respectively as outputs. Each of the difference signals 522a, 522b, 522c represents a difference in the state of two of the three signal wires 318a, 318b and 318c. The difference signals 522a, 522b, 522c are used to detect changes in the state of the three signal wires 318a, 318b and 318c compared to the state transmitted in the immediately preceding symbol period. Seven consecutive symbols representative of the transitions are assembled by the serial-to-parallel convertors 506 to obtain a set of 7 symbols 516 to be processed by the demapper 508. The demapper 508 produces 16 bits of data 518 that may be buffered in a first-in-first-out (FIFO) register 510 to provide output data 520.

The wire state decoder 504 may extract a sequence of symbols 514 from phase encoded signals received on the signal wires 318a, 318b and 318c. The symbols 514 are encoded as a combination of phase rotation and polarity as disclosed herein. The wire state decoder may include a CDR circuit 524 that extracts a clock 526 that can be used to reliably capture wire states from the signal wires 318a, 318b and 318c. A transition occurs on least one of the signal wires 318a, 318b and 318c at each symbol boundary and the CDR circuit 524 may be configured to generate the clock 526 based on the occurrence of a transition or multiple transitions. An edge of the clock may be delayed to allow time for all signal wires 318a, 318b and 318c to have stabilized and to thereby ensure that the current wire state is captured for decoding purposes.

Figure 6:
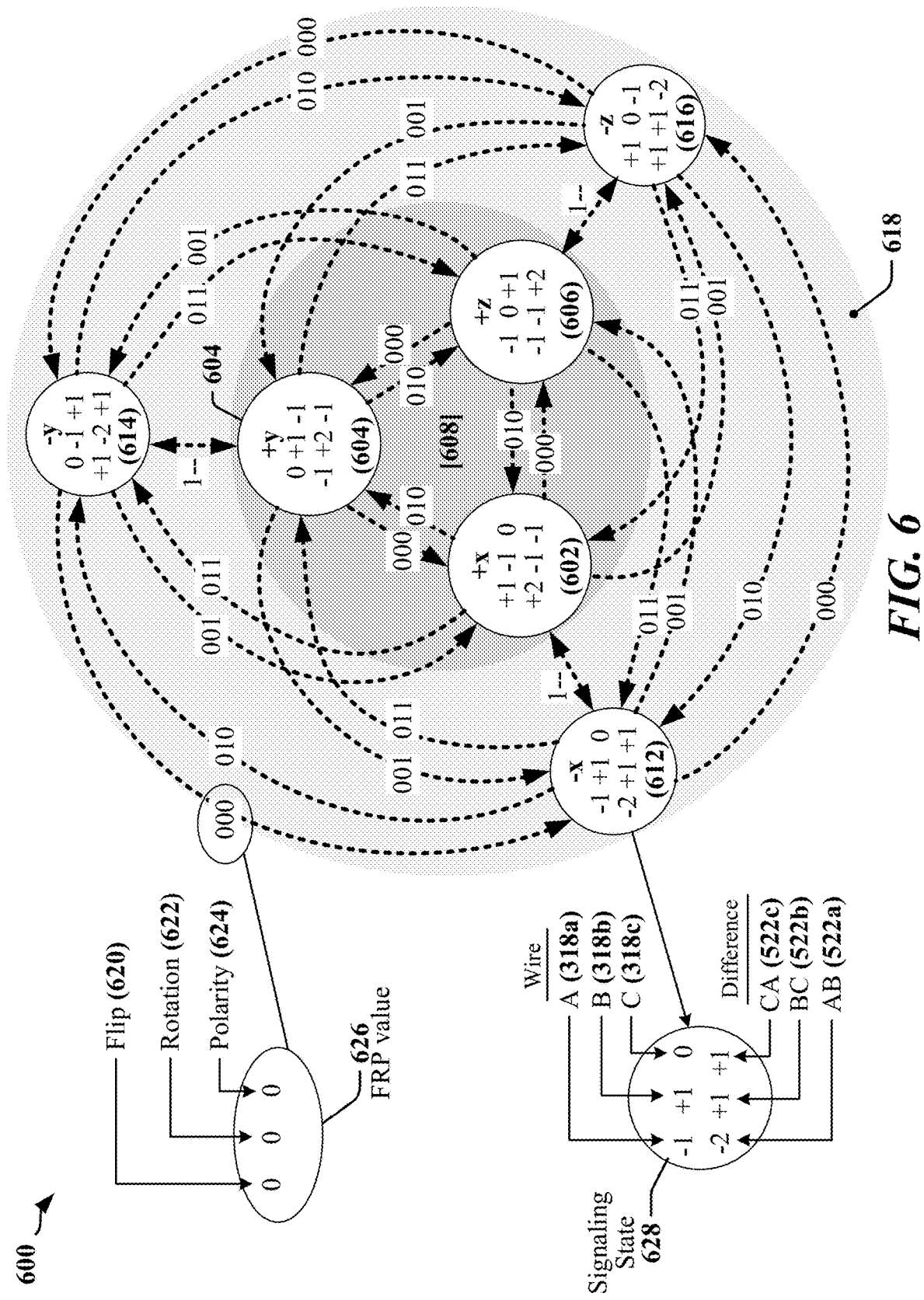
FIG. 6 is a state diagram illustrating potential state transitions in a C-PHY 3-phase encoded interface.

FIG. 6 is state diagram 600 illustrating the possible signaling states 602, 604, 606, 612, 614, 616 of the three wires, with the possible transitions illustrated from each state. In the example of a 3-wire, 3-phase communication link, 6 states and 30 state transitions are available. The possible signaling states 602, 604, 606, 612, 614 and 616 in the state diagram 600 include and expand on the states shown in the circular state diagram 450 of FIG. 4. As shown in the exemplar of a state element 628, each signaling state 602, 604, 606, 612, 614 and 616 in the state diagram 600 defines voltage signaling state of the signal wires 318a, 318b, 318c and the difference signals 522a, 522b, 522c that represent the result of a subtraction of corresponding wire voltages by corresponding differential receivers 502a, 502b, 502c. The signal wires 318a, 318b, 318c are labeled A, B and C respectively. For example, in signaling state 602 (+x) wire A=+1, wire B=−1 and wire C=0, yielding output of differential receiver 502a (A−B)=+2, differential receiver 502b (B−C)=−1 and differential receiver 502c (C−A)=−1. Transition decisions taken by phase change detect circuits in a receiver are based on 5 possible levels produced by the differential receivers 502a, 502b, 502c, which include −2, −1, 0, +1 and +2 voltage states.

The transitions in the state diagram 600 can be represented by a Flip, Rotate, Polarity symbol (e.g., the FRP symbol 626) that has one of the three-bit binary values in the set: {000, 001, 010, 011, 100}. The Rotation bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 626 corresponds to wire state changes for each transition. The state diagram 600 may be separated into an inner circle 608 that includes the positive polarity signaling states 602, 604, 606 and an outer circle 618 that encompasses the negative polarity signaling states 612, 614, 616.

Jitter in 3-Phase Interfaces

A 3-phase transmitter includes drivers that provide high, low and middle-level voltages onto the transmit channel. This results in some variable transitions between consecutive symbol intervals. Low-to-high and high-to-low voltage transitions may be referred to as full-swing transitions, while low-to-middle and high-to-middle voltage transitions may be referred to as half-swing transitions. Different types of transitions may have different rise or fall times, and may result in different zero crossings at the receiver. These differences can result in "encoding jitter," which may impact link signal integrity performance.

Figure 7:
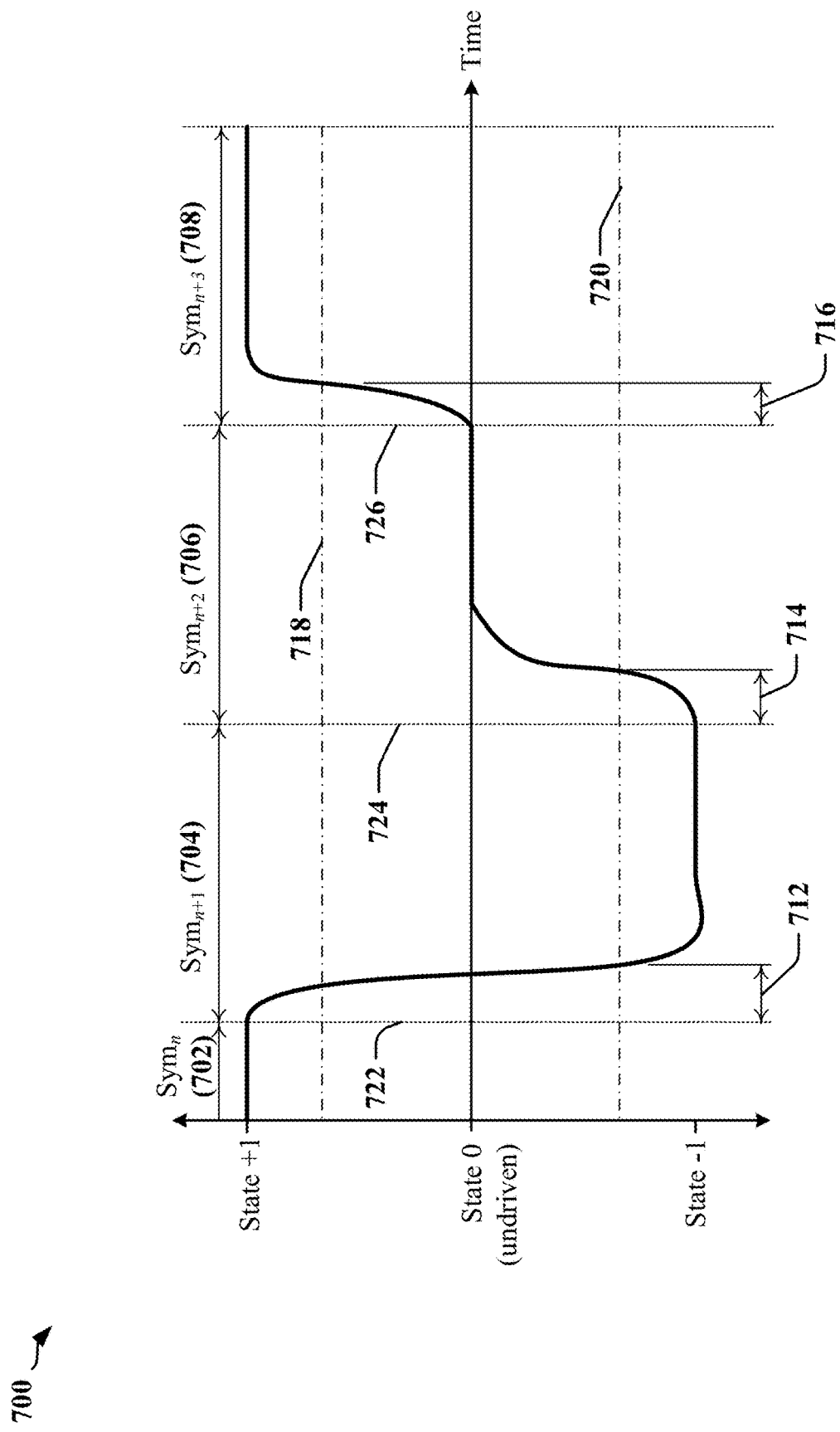
FIG. 7 is an example of the effects of signal rise times on transition detection in a C-PHY decoder.

FIG. 7 is a timing diagram 700 that illustrates certain aspects of transition variability at the output of a C-PHY 3-phase transmitter. Variability in signal transition times may be attributed to the existence of the different voltage and/or current levels used in 3-phase signaling. The timing diagram 700 illustrates transition times in a signal received from a single signal wire 318a, 318b or 318c. A first symbol $Sym_n$ 702 is transmitted in a first symbol interval that ends at a time 722 when a second symbol $Sym_{n+1}$ 704 is transmitted in a second symbol interval. The second symbol interval may end at time 724 when a third symbol $Sym_{n+2}$ 706 is transmitted in the third symbol interval, which ends at time 726 when a fourth symbol $Sym_{n+3}$ 708 is transmitted in a fourth symbol interval. The transition from a state determined by the first symbol 702 to the state corresponding to the second symbol 704 may be detectable after a delay 712 attributable to the time taken for voltage in the signal wire 318a, 318b or 318c to reach a threshold voltage 718 and/or 720. The threshold voltages may be used to determine the state of the signal wire 318a, 318b or 318c. The transition from a state determined by the second symbol 704 to the state for the third symbol 706 may be detectable after a delay 714 attributable to the time taken for voltage in the signal wire 318a, 318b or 318c to reach one of the threshold voltages 718 and/or 720. The transition from a state determined by the third symbol 706 to the state for the fourth symbol 708 may be detectable after a delay 716 attributable to the time taken for voltage in the signal wire 318a, 318b or 318c to reach a threshold voltage 718 and/or 720. The delays 712, 714 and 716 may have different durations, which may be attributable in part to variations in device manufacturing processes and operational conditions, which may produce unequal effects on transitions between different voltage or current levels associated with the 3 states and/or different transition magnitudes. These differences may contribute to jitter and other issues in C-PHY 3-phase receiver.

Figure 8:
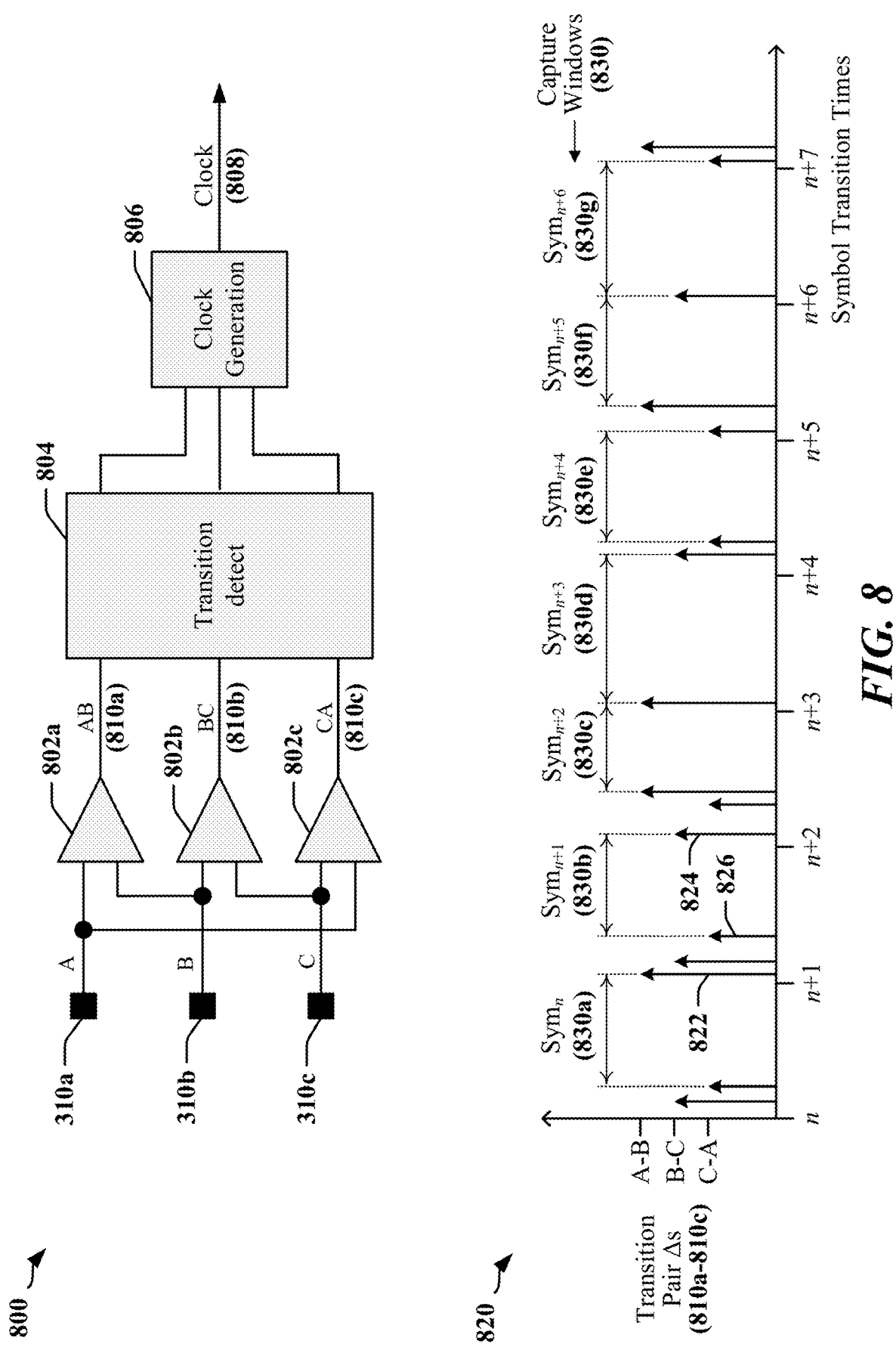
FIG. 8 illustrates transition detection in a C-PHY decoder.

FIG. 8 illustrates certain aspects of CDR circuits that may be provided in a receiver in a C-PHY interface 800. Differential receivers 802a, 802b and 802c are configured to generate a set of difference signals 810a, 810b, 810c by comparing signaling state of each different pair of signal wires 318a, 318b and 318c in a trio. In the illustrated example, a first differential receiver 802a provides an AB difference signal 810a representative of the difference in signaling state of A and B signal wires 318a and 318b, a second differential receiver 802b provides a BC difference signal 810b representative of the difference in signaling state of B and C signal wires 318b and 318c and a third differential receiver 802c provides a CA difference signal 810c representative of the difference in signaling state of C and A signal wires 318c and 318a. Accordingly, a transition detection circuit 804 can be configured to detect occurrence of a phase change because the output of at least one of the differential receivers 802a, 802b and 802c changes at the end of each symbol interval.

Transitions between some consecutively transmitted pairs of symbols may be detectable by a single differential receiver 802a, 802b or 802c, while other transitions may be detected by two or more of the differential receivers 802a, 802b and 802c. In one example the states, or relative states of two wires may be unchanged after a transition and the output of a corresponding differential receiver 802a, 802b or 802c may also be unchanged after the phase transition. Accordingly, a clock generation circuit 806 may include a transition detection circuit 804 and/or other logic to monitor the outputs of all differential receivers 802a, 802b and 802c in order to determine when a phase transition has occurred. The clock generation circuit may generate a receive clock signal 808 based on detected phase transitions.

Changes in signaling states of the 3 wires in a trio may be detected at different times, which can result in the difference signals 810a, 810b, 810c assuming stable states at different times. The state of the difference signals 810a, 810b, 810c may switch before stability has been reached after the signaling state of each signal wire 318a, 318b and/or 318c has transitioned to its defined state for a symbol transmission interval. The result of such variability is illustrated in the timing diagram 820 of FIG. 8.

The timing of signaling state change detection may vary according to the type of signaling state change that has occurred. Markers 822, 824 and 826 represent occurrences of transitions in the difference signals 810a, 810b, 810c provided to the transition detection circuit 804. The markers 822, 824 and 826 are assigned different heights in the timing diagram 820 for clarity of illustration only, and the relative heights of the markers 822, 824 and 826 are not intended to show a specific relationship to voltage or current levels, polarity or weighting values used for clock generation or data decoding. The timing diagram 820 illustrates the effect of timing of transitions associated with symbols transmitted in phase and polarity on the three signal wires 318a, 318b and 318c. In the timing diagram 820, transitions between some symbols may result in variable capture windows 830a, 830b, 830c, 830d, 830e, 830f and/or 830g (collectively symbol capture windows 830) during which symbols may be reliably captured. The number of state changes detected and their relative timing can result in jitter on the clock signal 808.

The throughput of a C-PHY communication link may be affected by duration and variability in signal transition times. A CDR may use a mask to prevent transitions between symbols that are reflected in two or more of the difference signals 810a, 810b, 810c from affecting recovery of the receive clock. In one example, the mask may be implemented to block multiple transitions in the difference signals 810a, 810b, 810c after the first transition in a difference signal 810a, 810b, 810c is detected. In another example, the mask may be implemented by generating a pulse from the first transition with a duration that exceeds the duration of the signal transition region between symbols. The duration in which the mask is in effect can limit channel bandwidth for a C-PHY interface. The duration in which the mask is in effect is typically calculated to accommodate variability in the operation of transition detection circuits. Variability in transition detection circuits can be caused by manufacturing process tolerances, variations and stability of voltage and current sources and operating temperature, as well as by the electrical characteristics of the signal wires 318a, 318b and 318c. The variability in detection circuits may further limit channel bandwidth.

Figure 9:
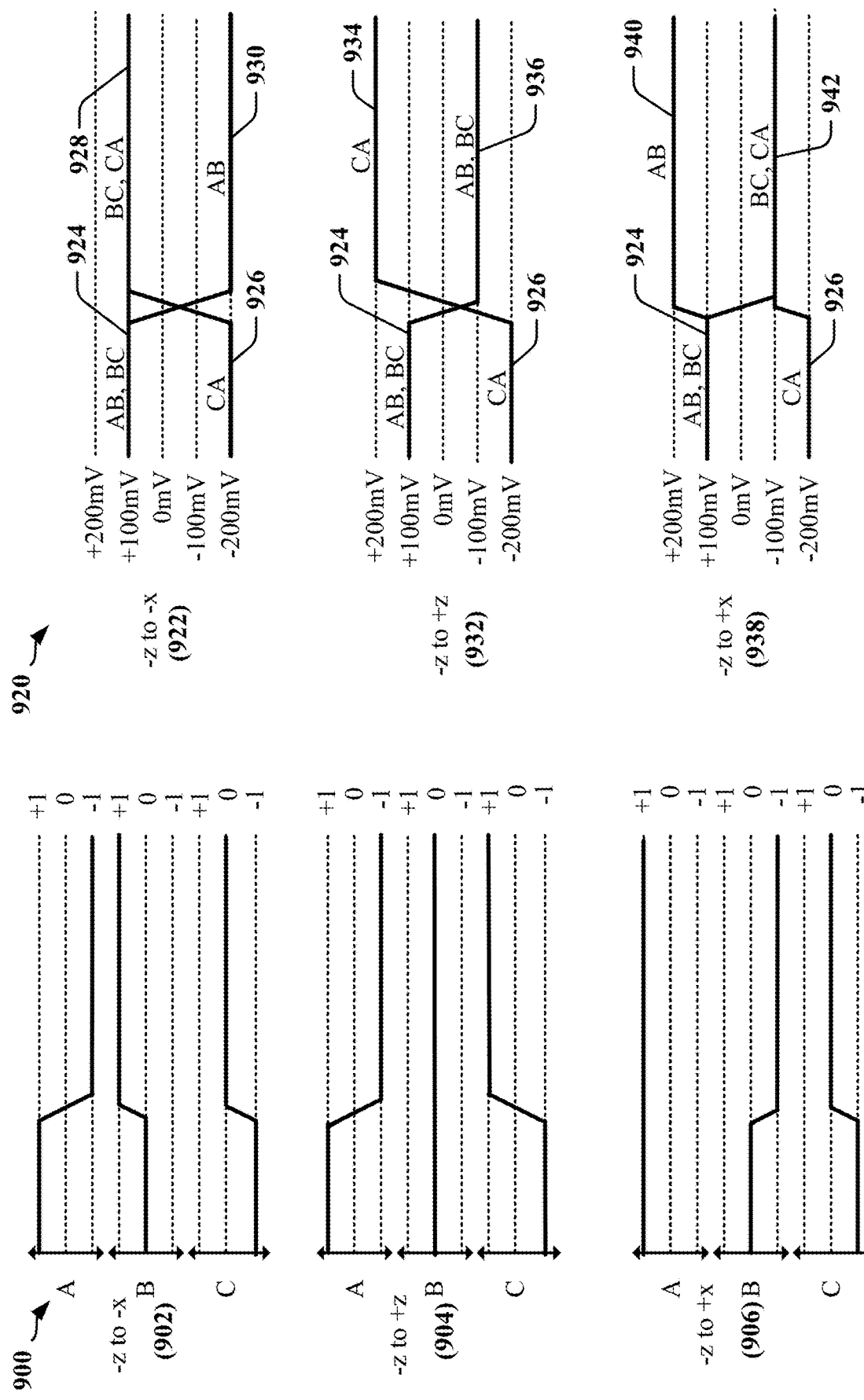
FIG. 9 illustrates one example of signal transitions occurring between pairs of consecutive symbols transmitted on a C-PHY interface.

FIG. 9 includes timing diagrams 900 and 920 representative of certain examples of transitions from a first signaling state to a second signaling state between certain consecutive symbols. The signaling state transitions illustrated in the timing diagrams 900 and 920 are selected for illustrative purposes, and other transitions and combinations of transitions can occur in a MIPI Alliance C-PHY interface. The timing diagrams 900 and 920 relate to an example of a 3-wire, 3-phase communication link, in which multiple receiver output transitions may occur at each symbol interval boundary due to differences in rise and fall time between the signal levels on the trio of wires. With reference also to FIG. 8, the first timing diagrams 900 illustrate the signaling states of the trio of signal wires 318a, 318b and 318c (A, B, and C) before and after a transition and second timing diagrams 920 illustrate the outputs of the differential receivers 802a, 802b and 802c, which provides difference signals 810a, 810b, 810c representative of the differences between signal wires 318a, 318b and 318c. In many instances, a set of differential receivers 802a, 802b and 802c may be configured to capture transitions by comparing different combinations for two signal wires 318a, 318b and 318c. In one example, these differential receivers 802a, 802b and 802c may be configured to produce outputs by determining the difference (e.g. by subtraction) of their respective input voltages.

In each of the examples shown in the timing diagrams 900 and 920, the initial a symbol representing the −z state 616 (see FIG. 8) transitions to a different symbol. As shown in the timing diagrams 902, 904 and 906 signal A is initially in a +1 state, signal B is in a 0 state and signal C is in the −1 state. Accordingly, the differential receivers 802a, 802b initially measure a +100 mV difference 924 and the differential receiver 802c measures a −200 mV difference 926, as shown in the timing diagrams 922, 932, 938 for the differential receiver outputs.

In a first example corresponding to the timing diagrams 902, 922, a transition occurs from a symbol representing the −z state 616 to a symbol representing the −x signaling state 612 (see FIG. 6) in which signal A transitions to a −1 state, signal B transitions to a +1 state and signal C transitions to a 0 state, with the differential receiver 802a transitioning from +100 mV level 924 to a −200 mV level 930, differential receiver 802b remaining at a +100 mV level 924, 928 and differential receiver 802c transitioning from a −200 mV level 926 to a +100 mV level 928.

In a second example corresponding to the timing diagrams 904, 932, a transition occurs from a symbol representing the −z signaling state 616 to a symbol representing the +z signaling state 606 in which signal A transitions to a −1 state, signal B remains at the 0 state and signal C transitions to a +1 state, with two differential receivers 802a and 802b transitioning from +100 mV level 924 to a −100 mV level 936, and differential receiver 802c transitioning from −200 mV level 926 to a +200 mV level 934.

In a third example corresponding to the timing diagrams 906, 938, a transition occurs from a symbol representing the −z signaling state 616 to a symbol representing the +x signaling state 602 in which signal A remains at the +1 state, signal B transitions to the −1 state and signal C transitions to a 0 state, with the differential receiver 802a transitioning from a +100 mV level 924 to a +200 mV level 940, the differential receiver 802b transitioning from a +100 mV level 924 to a −100 mV level 942, and the differential receiver 802c transitioning from −200 mV level 926 to a −100 mV level 942.

These examples illustrate transitions in measured differences, where the transitions can span 0, 1, 2, 3, 4 and 5 levels. Pre-emphasis techniques used for typical differential or single-ended serial transmitters were developed for two level transitions and may introduce certain adverse effects if used on a MIPI Alliance C-PHY 3-phase signal. In particular, a pre-emphasis circuit that overdrives a signal during transitions may cause overshoot during transitions spanning 1 or 2 levels and may cause false triggers to occur in edge sensitive circuits.

An M-wire N-Phase encoding system, such as a 3-wire, 3-phase encoder may encode a signal that has at least one transition at every symbol boundary and the receiver may recover a clock using those guaranteed transitions. In some implementations, the receiver requires data signals to be stable immediately prior to the first signal transition at a symbol boundary, and must also be able to reliably mask any occurrences of multiple transitions that are correlated to the same symbol boundary. Multiple receiver transitions may occur due to slight differences in rise and fall time between the signals carried on the M-wires (e.g. a trio of wires) and due to slight differences in signal propagation times between the combinations of signal pairs received (e.g. A-B, B-C, and C-A outputs of differential receivers 802a, 802b and 802c of FIG. 6).

Figure 10:
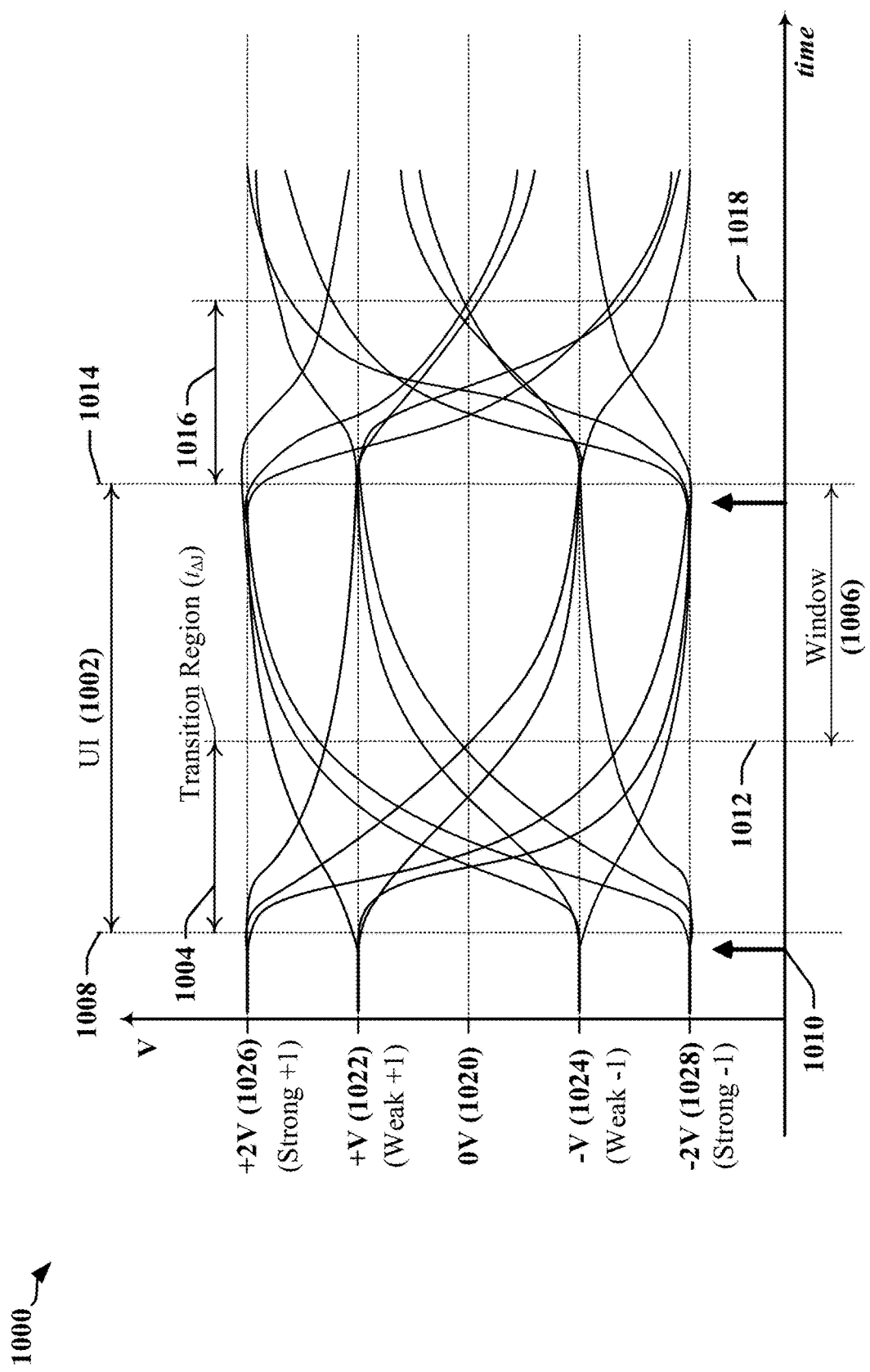
FIG. 10 illustrates transition regions and eye regions in an eye-pattern for a C-PHY interface.

FIG. 10 illustrates an example of a multi-level eye-pattern 1000 generated for the outputs of a set of three differential receivers that each compare two of three signals received over a C-PHY interface. The multi-level eye-pattern 1000 may be generated by overlaying the signals output by the differential receivers 802a, 802b, 802c in a C-PHY receiver circuit (see FIG. 8). The multi-level eye-pattern 1000 spans a symbol interval, which may be referred to as a unit interval (UI 1002). The UI 1002 may correspond to the period of a transmission clock used to control transmission of each symbol or the period of a receive clock recovered from signaling received from the C-PHY bus.

In one example, the multi-level eye-pattern 1000 may be generated using a fixed, symbol-independent trigger 1010. In the multi-level eye-pattern 1000, five nominal voltage levels 1020, 1022, 1024, 1026, 1028 define the potential states of the outputs of the differential receivers 802a, 802b, 802c in. The multi-level eye-pattern 1000 illustrates the possible transitions at the outputs of the differential receivers 802a, 802b, 802c used to 3-wire, 3-phase encoded signals. The three voltage levels defined for the 3-wire, 3-phase encoded signals can cause the differential receivers 802a, 802b, and 802c to generate outputs that vary between strong voltage levels 1026, 1028 and weak voltage levels 1022, 1024 for both positive and negative polarities. Typically, only one signal wire 318a, 318b and 318c is undriven in any symbol and the differential receivers 802a, 802b, and 802c do not produce a 0 state output corresponding to the 0-Volt voltage level 1020.

The voltage levels 1022, 1024, 1026, 1028 corresponding to weak and strong voltage levels need not be evenly spaced with respect to the 0-Volt voltage level 1020. For example, the weak voltage levels 1022, 1024 represent a comparison of voltages that may include a mid-point voltage defined for the signal wires 318a, 318b and 318c, or a voltage level reached by an undriven signal wire 318a, 318b and 318c.

The multi-level eye-pattern 1000 may use reference point in time (e.g. a trigger based on a transmission clock) to overlap the waveforms produced by the differential receivers 802a, 802b, and 802c. In the receivers, the three pairs of difference signals are generated simultaneously to enable data capture at the receiving device. The waveforms illustrated in FIG. 10 are representative of the difference signals 810a, 810b, 810c (A-B, B-C, and C-A) produced by the differential receivers 802a, 802b.

Drivers, receivers and other devices used in a C-PHY 3-Phase decoder may exhibit different switching characteristics that can exhibit as relative delays between signals received from the three wires. Multiple receiver output transitions may be observed at each symbol interval boundary 1008 and/or 1014 due to differences in the rise and fall time between the three signals of the trio of signal wires 318a, 318b, 318c and due to differences in signal propagation times between the combinations of pairs of signals received from the signal wires 318a, 318b, 318c. The multi-level eye-pattern 1000 may capture variances in rise and fall times as a relative delay in transitions near each symbol interval boundary 1008 and 1014. In some examples, the variances in rise and fall times may be due to the different characteristics of the 3-Phase drivers. Differences in rise and fall times may also result in an effective shortening or lengthening of the duration of the observed or effective symbol interval at the receiver for any given symbol.

A signal transition region 1004, 1016 represents a time, or period of uncertainty, where variable signal rise times prevent reliable decoding. The illustrated signal transition regions 1004, 1016 may commence at a symbol interval boundary 1008, 1014 and terminate at an endpoint 1012, 1018 corresponding to the last crossing of the 0-Volt voltage level 1020 by a difference signal 810a, 810b, 810c. Signaling state may be reliably determined in an "eye opening" or window 1006 representing the time period in which the symbol is stable and can be reliably received and decoded. In one example, a window 1006 may be considered to begin at the endpoint 1012 of the signal transition region 1004, and the window 1006 may be considered to close at the next symbol interval boundary 1014 of the symbol interval, and/or when the signaling state of the signal wires 318a, 318b, 318c and/or the outputs of the three differential receivers 802a, 802b and 802c have begun to change to reflect the next symbol.

The maximum transmission speed of a C-PHY interface may be limited by the duration of the signal transition region 1004, 1016 compared to the window 1006. A receiver may use a mask circuit that blocks transition detection after the first-detected transition during signal transition regions 1004, 1016. After the first-detected transition, the mask circuit may ignore subsequent transitions for a duration that corresponds to the longest expected or measured signal transition region 1004, 1016. The duration of the window 1006 is affected by the duration of the mask.

Clock Generation for High-Speed C-PHY 3-Phase Interfaces

In some C-PHY CDRs, inverter-based pulse generators may be used to generate short pulses at every rising edge of the CDR inputs. In one aspect, pulse-based clock generation can mitigate against the effects of variations in manufacturing process, circuit supply voltage, and die temperature (PVT) by separating the C-PHY input-delta based pulse generator from the delay loop. In some examples, a programmable generator may be employed to generate a half-UI signal that is to be used to sample data in order to remove the timing constraints inherent in conventional CDR designs.

Figure 11:
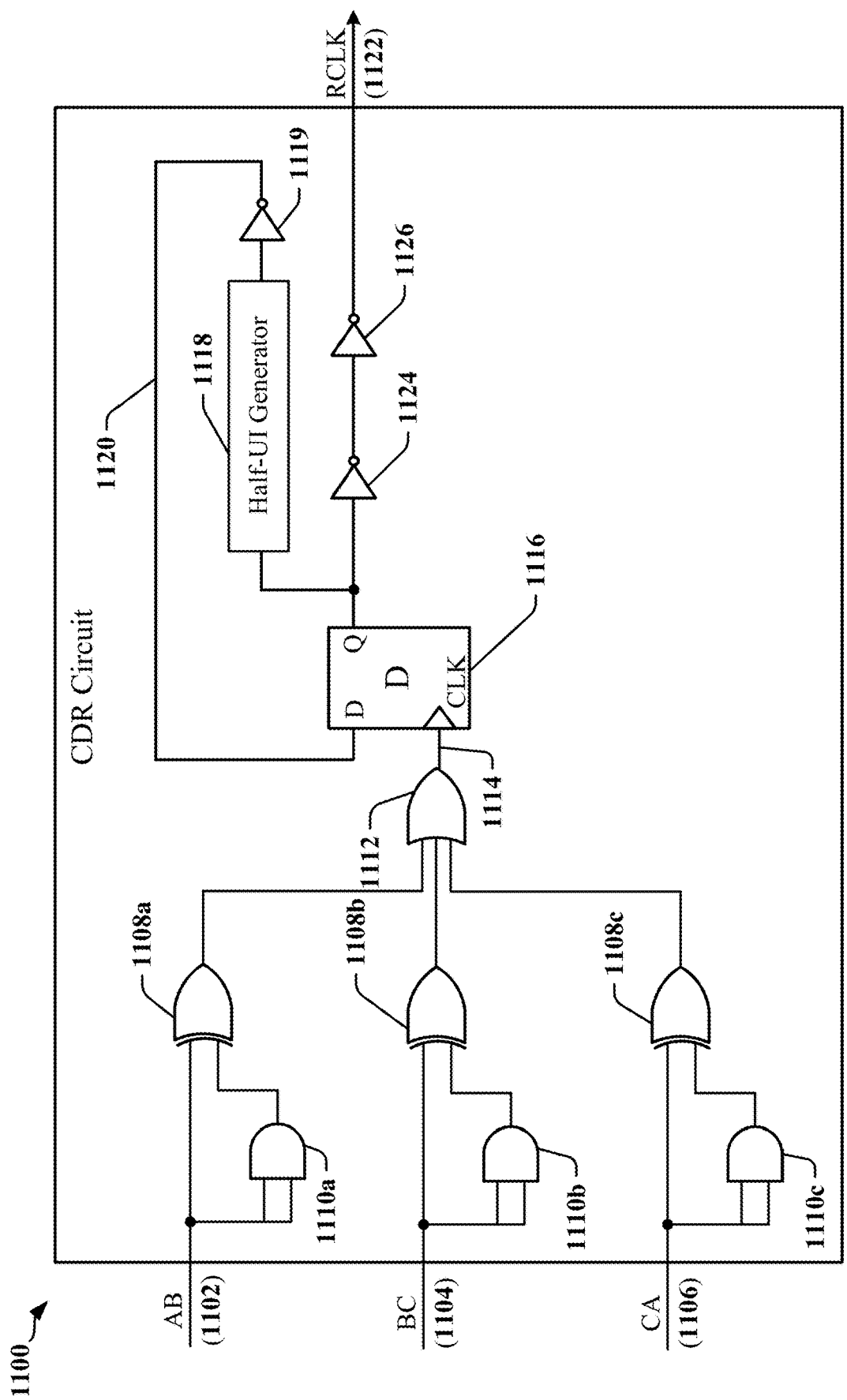
FIG. 11 illustrates an example of a clock generation circuit according to certain aspects disclosed herein.

FIG. 11 illustrates an example of a CDR 1100 that separates half-rate clock generation from the C-PHY input-delta pulse generation. As illustrated, the C-PHY input delta includes the AB, BC, and CA difference signals 1102, 1104, 1106, which are input to a network of logic gates 1108a, 1108b, and 1108c (XOR gates in this example), logic gates 1110a, 1110b, and 1110c, and OR gate 1112 in order to generate pulses in a first clock signal 1114 based on the transitions in the difference signals 1102, 1104, 1106.

The clock signal 1114 is input to a flip-flop logic 1116, such as a D flip-flop, where the flip-flop logic 1116 is clocked by pulses in the clock signal 1114 where an input value (data or D) is held on an output (Q) until a pulse or asserted value is input at a clock input (CLK). The flip-flop logic 1116 is, in turn, coupled in a delay loop comprised of a programmable generator 1118 coupled to the output Q of the flip-flop logic 1116. Generator 1118 may be a half-UI generator that is configured to generate a half UI based recovered clock (i.e., a clock having a cycle equal to two UI's or half the rate of the clock rate of the incoming first clock signal or pulses). The generated half rate or delayed RCLK clock 1120 produced by generator 1118 is fed back to the data input of the flip-flop logic as part of delay loop, which includes an inverter 1119, which inverts the signal output by the generator 1118. Since the flip-flop logic 1116 is clocked by pulses in the clock signal 1114, with a D flip-flop in an aspect, resampling by the flip-flop logic 1116 will occur with each pulse rising edge. It is noted that the half-UI generator may be preconfigured or be configured according to predetermined algorithm/metric. Also, the generator 1118 may be pre-calibrated before high-speed data bursts are received in the receiver. The output Q of flip-flop logic 1116 is then also used to derive the recovered clock signal (RCLK) 1122 to be used in the decoder of the receiver (e.g., decoder 600 as shown in FIG. 6) after being passed through inverters 1124 and 1126. In one aspect of the present disclosure, the inverters 1124 and 1126 are provided to act as a buffer to drive the loading of the RCLK signal, but the illustrated CDR 1100 is not limited to use of such buffering devices and could be operable with other buffering device or even operable without the buffering operation in other implementations.

An automatic half UI tracking pulse is created as soon the first data transition is received at the CDR 1100, regardless of the other possible transitions that may occur in input data within one UI. The first transition operates as a start indicator for half-UI generator 1118 to produce a pulse for the flip-flop logic 1116 to pull down the voltage to generate a half-UI based recovered clock. The Q output of the flip-flop logic 1116 also constitutes the recovered clock signal RCLK 1122, which will be a half UI or half rate clock. The illustrated circuit structure is not subject to PVT or mismatch between lanes since the circuitry only considers an absolute UI timing relationship.

Figure 12:
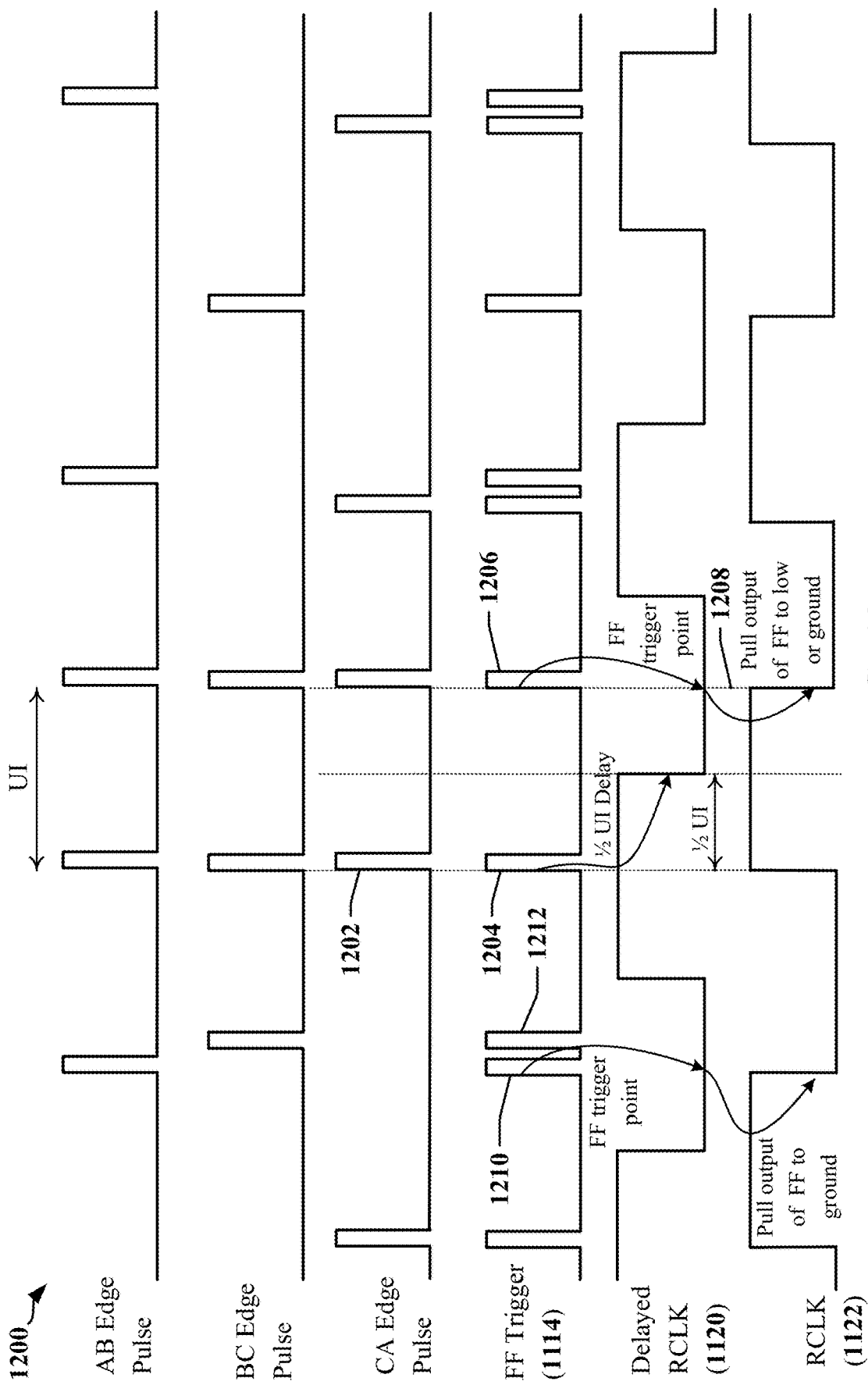
FIG. 12 illustrates a timing diagram of the timing associated with the clock generation circuit of FIG. 11.

FIG. 12 illustrates a timing diagram 1200 of the CDR implementation shown in FIG. 11. The timing diagram is merely exemplary showing various instances of pulses and clock signals that might occur in the system of FIG. 11 and how the CDR 1100 responds and operates in these instances, and is not intended to limit the description of the operation thereof to this one example. As may be seen in the diagram 1200, various pulse edges that results from transitions of the three difference signals AB, BC, and CA. For simplicity of illustration, the pulse edges of the difference signals are shown, but those skilled in the art will appreciate that the actual difference signals continue for periods of time with signal transitions occurring from high to low or low to high where the illustrated pulse edges are illustrated.

FIG. 12 also shows the signals occurring at the flip-flop logic input (i.e., clock signal 1114), the data (D) input (i.e., delayed RCLK signal 1120), and the Q output (i.e., RCLK signal 1122). As illustrated, the flip-flop logic clock signal 1114 signal output from OR gate 1112 that results from transitions of the various difference signals AB, BC, CA will trigger the flip-flop logic 1116 at a periodicity of one UI. Looking at edge pulse 1202 of the CA difference signal, as an example, FIG. 12 illustrates that the CA edge pulse 1202 will cause a triggering of the flip-flop logic as shown by pulse 1204, which correlates to clock signal 1114 in the circuit of FIG. 11. The delayed recovered clock signal 1120 provided by the programmable half UI generator 1118 to the data input (D) of the flip-flop logic 1116 may be seen to be a half rate or frequency clock signal that is delayed by one half UI from the clock signal 1114 input to flip-flop logic 1116 by operation of the generator 1118, which correlates to the change of state on the flip-flop logic 1116 due to the pulse 1204 and the state of the delayed RCLK 1120 being high due to inversion by inverter 1119.

When a next trigger pulse 1206 occurs after a UI time period from the previous pulse 1204, because the delayed clock 1120 input to the flip-flop logic 1116 is low, the output Q will be pulled low or to ground and the correlating recovered RCLK signal 1122 as may be seen at time 1208. In this manner, the recovered clock signal RCLK having a half rate of the incoming signals on wires A, B, and C.

In cases where two transitions occur between the A, B, and C wires close in time resulting in two edge pulses delivered at the output in proximity, the first occurring pulse may trigger the flip-flop output Q (i.e., the RCLK signal 1122) being pulled from high to low as may be seen with the example of pulses 1210 and 1212. Because the delayed RCLK signal 1120 is low, however, the second pulse 1212 will not affect the state of output Q as the output has been pulled low and the delayed RCLK signal 1120 is still low.

The inverter-based pulse-generating CDR 1100 of FIG. 11 generates short pulses at every rising edge of the CDR inputs that can be used generate timing for the translation of differential voltages to proper wire state provided pulses are sufficiently short to prevent overlap between successive UIs. The minimum pulse width cannot be shorter in duration than the maximum settling time of each wire state for all expected variations in PVT conditions. A pulse-generating CDR is unavoidably constrained by a stringent requirement on the pulse width being well-tuned to operating conditions. The tuning of pulse width can be particularly challenging at higher speed across all possible PVT variations. Furthermore, the pulse-generating CDR may simply OR all pulses for clock recovery purposes and an additional half-rate clock recovery circuit is needed to allow time-interleaving and relax channel bandwidth requirement for high speed applications.

Certain aspects of this disclosure can leverage unique data patterns in the outputs of differential receivers used in a C-PHY interface. In one aspect, a CDR can be configured to operate without being dependent on explicit delay tuning in a pulse generating circuit. In one example, a rule deduced from C-PHY protocols related to data patterns permits recovery of complete wire state in a UI based solely on a comparison of magnitude and polarity of voltage on each wire. The term magnitude is used herein to denote the value of voltage or current without reference to polarity. For example, the voltage levels −200 mV and +200 mV have the same magnitude but different polarities. In one example illustrated with continued reference to FIGS. 6, 8 and 9, the difference signals 810a, 810b, 810c produced by the differential receivers 802a, 802b, 802c can have a nominal magnitude of 100 mV or 200 mV and can have positive or negative polarity yielding the four possible nominal difference voltages {−200 mV, −100 mV, +100 mV, +200 mV} outside transition periods. Each of the −200 mV and +200 mV levels may be referred to as a strong voltage, strong voltage level, strong difference voltage or strong difference and the −100 mV and +100 mV levels may be referred to as weak voltages, weak voltage levels, weak difference voltages or weak differences.

Certain aspects of this disclosure enable the complete signaling state for a trio to be determined based on comparison of the difference signals 810a, 810b, 810c provided by the differential receiver 802a, 802b and 802c to determine magnitude and polarity. A rule deduced from C-PHY protocols holds that a valid state for three-wire a C-PHY bus guarantees that a strong difference voltage can be observed in only one of the difference signals 810a, 810b, 810c produced by the differential receivers 802a, 802b and 802c in each UI. Detection of the strong difference voltage and its polarity and identification of the wire pair that produced the strong difference voltage is sufficient to generate a pulse in the receive clock signal and determine complete wire state for the trio. The validity of the deduced rule is confirmed by FIG. 6, which shows that each valid or possible signaling state 602, 604, 606, 612, 614, 616 has only one difference signal at the strong voltage level. Using this rule, the complete signaling state for a trio in any UI can be determined by identifying the difference signal 810a, 810b, 810c that is at a strong voltage level in the UI and the polarity of the strong voltage level.

Certain aspects of the disclosure provide a CDR that can recover a half-rate clock and reliably capture wire state in each UI based on the identification of the differential receiver 802a, 802b and 802c that produces a strong voltage level at its output and the polarity of the strong voltage level. For example, when the AB differential receiver 802a provides a strong voltage level in a first UI, then the state of the wires 318a, 318b, 318c corresponds to the +x signaling state 602 or the −x signaling state 612. A positive strong voltage determines that the +x signaling state 602 is present and a negative strong voltage determines that the −x signaling state 602 is present. It will be appreciated that different circuit designs may use reverse polarities to represent signaling state or difference outputs.

Figure 13:
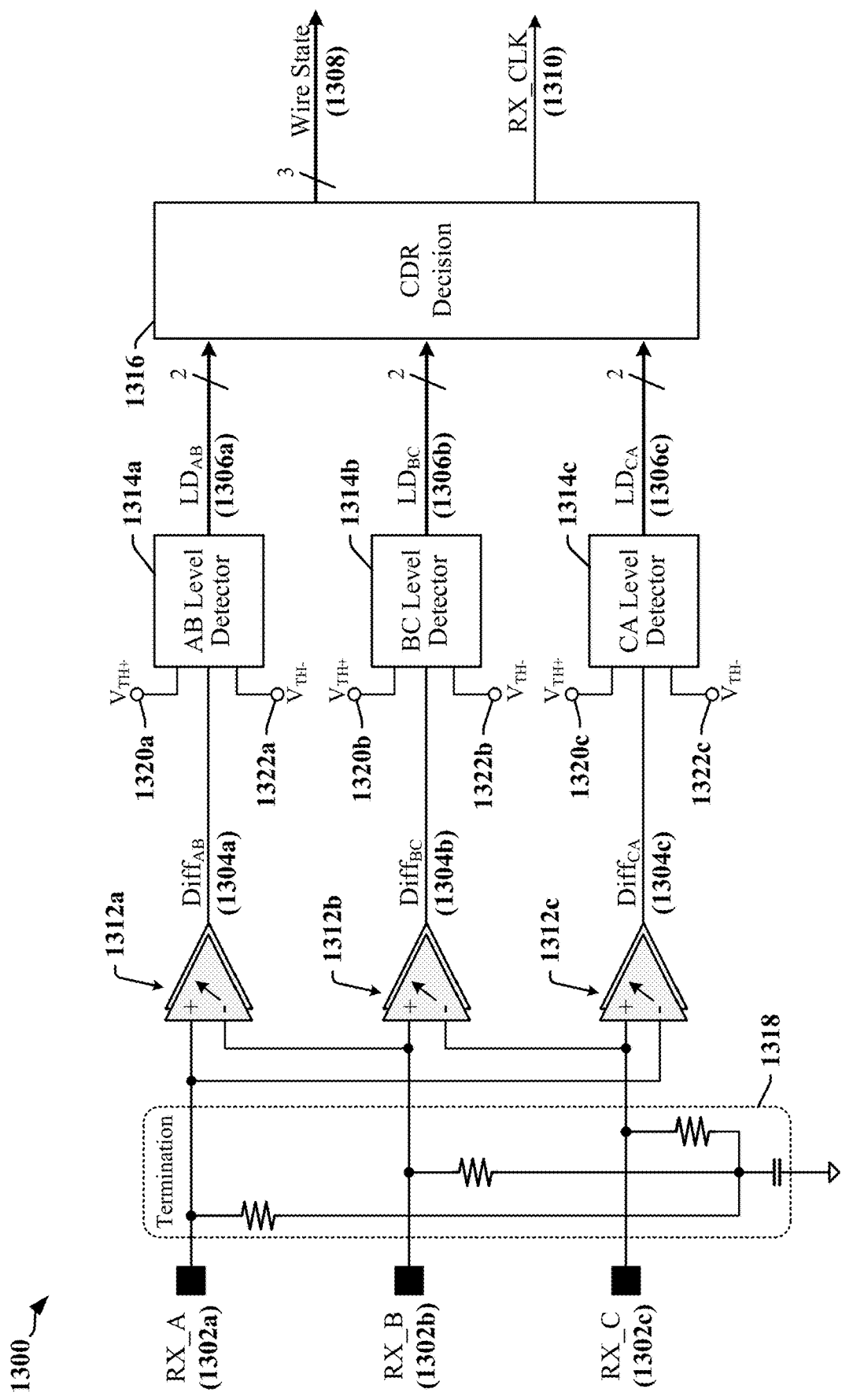
FIG. 13 illustrates a receiver circuit that includes a clock and data recovery circuit provided in accordance with certain aspects of this disclosure.

FIG. 13 illustrates a receiver circuit 1300 that can perform clock and data recovery based on identification of the difference signal 1304a, 1304b, 1304c that has the strong voltage level in a UI. The difference signals 1304a, 1304b, 1304c are produced by three differential receivers 1312a, 1312b, 1312c configured to compare signal state on mutually different pairs of wires 1302a, 1302b, 1302c. An AB differential receiver 1312a compares the received states of the A wire 1302a and the B wire 1302b, a BC differential receiver 1312b compares the received states of the B wire 1302b and the C wire 1302c and a CA differential receiver 1312c compares the received states of the C wire 1302c and the A wire 1302a. In the illustrated example, each of the differential receivers 1312a, 1312b, 1312c includes one or more equalizing circuits. In one example, each of the differential receivers 1312a, 1312b, 1312c includes a continuous-time linear equalizer (CTLE) and a variable gain amplifier (VGA).

Each difference signal 1304a, 1304b, 1304c is provided to a level detector circuit 1314a, 1314b, 1314c. Each level detector circuit 1314a, 1314b, 1314c is configured to determine whether the voltage on the corresponding difference signal 1304a, 1304b, 1304c exceeds a positive threshold voltage level 1320a, 1320b, 1320c or is less than a negative threshold voltage level 1322a, 1322b, 1322c. In the one example, each level detector circuit 1314a, 1314b, 1314c outputs a two-bit level detect (LD) signal (e.g., the LD signals 1306a, 1306b, 1306c) in which one bit indicates that the magnitude of the corresponding difference signal 1304a, 1304b, 1304c indicates a strong difference (e.g., nominal 200 mV as opposed to nominal 100 mV) and another bit indicates polarity of the corresponding difference signal 1304a, 1304b, 1304c. In another example, the LD signal 1306a, 1306b, 1306c output by each level detector circuit 1314a, 1314b, 1314c includes a first bit that indicates a strong positive difference output when set high (or set low in some examples) and a second bit indicates a strong negative difference output when set. In the latter example, only one bit in the LD signal 1306a, 1306b, 1306c can be set high in any UI and both bits can be set low in one or more UIs. In some examples, the positive threshold voltage levels 1320a, 1320b, 1320c and the negative threshold voltage levels 1322a, 1322b, 1322c are configured with a magnitude that lies between 200 mV and 100 mV.

Figure 14:
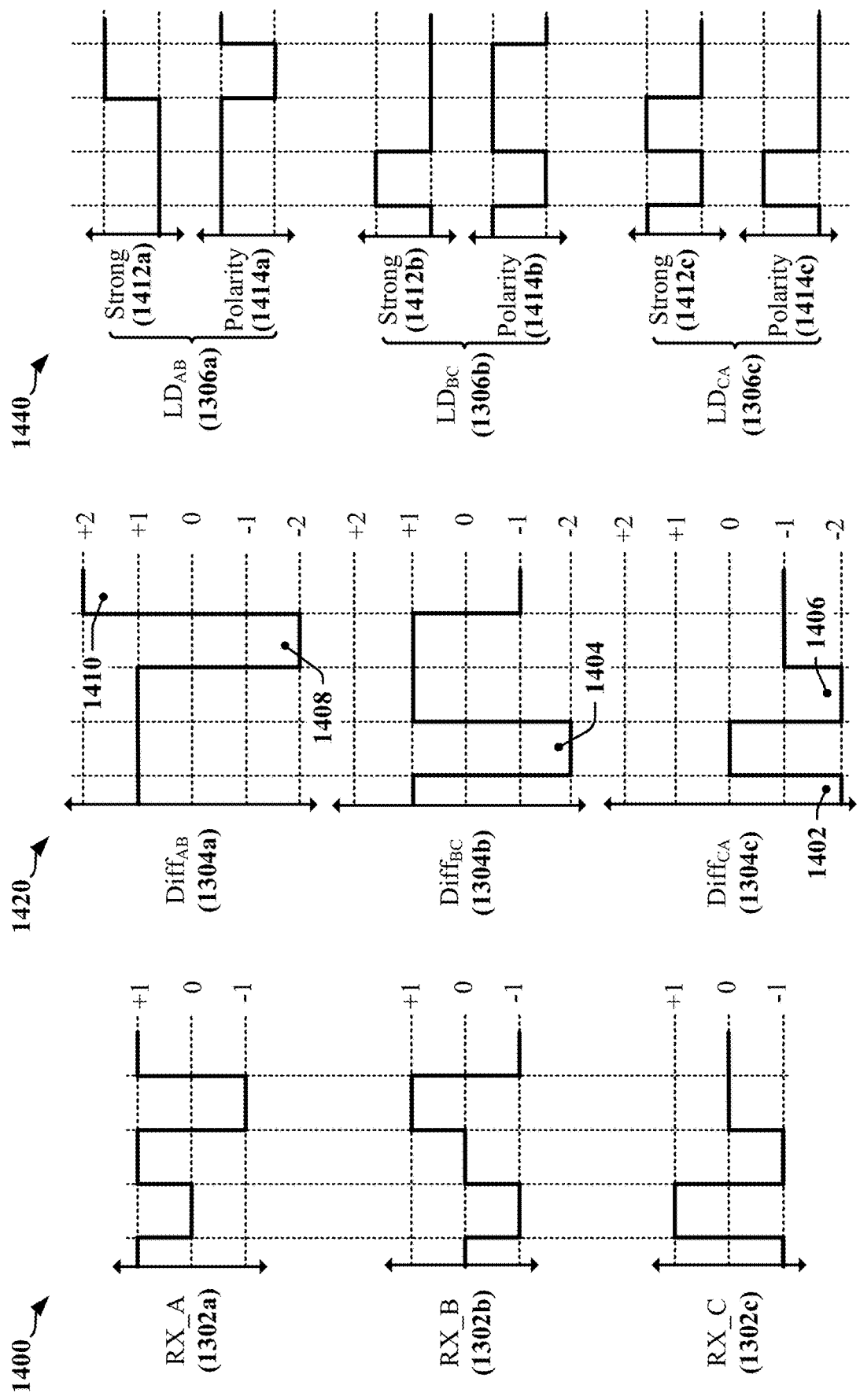
FIG. 14 illustrates certain aspects of the operation of the receiver circuit illustrated in FIG. 13.

FIG. 14 illustrates certain aspects of operation of the receiver circuit 1300 over 5 UIs. First timing diagrams 1400 represent the signaling state received from the wires 1302a, 1302b, 1302c of a C-PHY trio during the 5UIs. Second timing diagrams 14200 represent the difference signals 1304a, 1304b, 1304c produced by the differential receivers 1312a, 1312b, 1312c based on the signaling state received from the wires 1302a, 1302b, 1302c during the 5UIs. Third timing diagrams 1440 represent the LD signals 1306a, 1306b, 1306c output by the level detector circuits 1314a, 1314b, 1314c responsive to the difference signals 1304a, 1304b, 1304c.

In the second timing diagrams 1420, only one strong difference voltage 1402, 1404, 1406, 1408 or 1410 is produced in each UI. The third timing diagrams 1440 relates to two-bit LD signals 1306a, 1306b, 1306c. The LD signals 1306a, 1306b, 1306c each include a first bit 1412a, 1412b or 1412c that is in a logic high state when the corresponding difference signal 1304a, 1304b or 1304c has a voltage magnitude that qualifies as a strong difference voltage. The LD signals 1306a, 1306b, 1306c each include a second bit 1414a, 1414b or 1414c that indicates polarity of the corresponding difference signal 1304a, 1304b or 1304c. For example, the strong difference voltage 1408, 1410 is produced by the AB differential receiver 1312a in the last two UIs, with the first of these strong difference voltages 1408 having a negative polarity and the second of these strong difference voltages 1410 having a positive polarity indicating a +x signaling state 602 followed by a −x signaling state 612 (see FIG. 6).

The LD signals 1306a, 1306b, 1306c output by the level detector circuits 1314a, 1314b, 1314c are provided to CDR decision logic 1316 that is configured to generate a receive clock signal 1310 and a 3-bit wire state signal 1308 representing wire state for a current UI. In one example, the CDR decision logic 1316 is configured to select between 6 possible values for the wire state signal 1308. In one example, each LD signal 1306a, 1306b, 1306c includes a first bit that indicates a strong difference detected and a second bit that indicates polarity. Only one of the LD signals 1306a, 1306b, 1306c indicates a strong difference detected and this LD signal 1306a, 1306b, 1306c is used to select the value for the wire state signal 1308. For example, when the difference signal 1304a produced by the AB differential receiver 1312a indicates a strong difference, then the CDR decision logic 1316 may be configured to use the polarity information in the difference signal 1304a to select between a value representing the +x signaling state 602 and a value representing the −x signaling state 612 (see FIG. 6) as the 3-bit wire state signal 1308 output by the CDR decision logic 1316. In some examples, the CDR decision logic 1316 uses a lookup table indexed by the binary values of the LD signals 1306a, 1306b, 1306c to select the 3-bit wire state signal 1308 output by the CDR decision logic 1316. In other examples, the 3-bit wire state signal 1308 output by the CDR decision logic 1316 is generated by combinational logic that receives as its input the LD signals 1306a, 1306b, 1306c generated by the level detector circuits 1314a, 1314b, 1314c.

The 3-bit wire state signal 1308 output by the CDR decision logic 1316 can be generated as soon as a transition in the LD signals 1306a, 1306b, 1306c generated by the level detector circuits 1314a, 1314b, 1314c indicates a newly detected strong difference between two of the wires 1302a, 1302b, 1302c. According to C-PHY protocols, the same signaling state cannot be repeated in successive UIs enabling a clock signal to be generated in direct response to transitions in the LD signals 1306a, 1306b, 1306c. Each valid signaling state of the wires 1302a, 1302b, 1302c causes only one of the differential receivers 1312a, 1312b, 1312c to generate a strong difference and each differential receiver 1312a, 1312b, 1312c can indicate that the difference between its inputs is positive or negative. The CDR decision logic 1316 responds to either a change in the first bit 1412a, 1412b or 1412c of the LD signal 1306a, 1306b, 1306c that indicates a strong difference, or a change in the second bit 1414a, 1414b or 1414c that indicates polarity of the strong difference voltage. In both cases, the detection of change related to one differential receiver 1312a, 1312b, 1312c is sufficient to generate an edge in the receive clock signal 1310.

The one-to-one correlation between strong voltage level and its recovered wire state enables the receiver circuit 1300 to generate the complete wire state information based on voltage level. The ability to generate the complete wire state information from voltage level at the output of only one differential receiver 1312a, 1312b, 1312c eliminates the need for an explicit delay to accommodate variable transition times at the outputs of the differential receivers 1312a, 1312b, 1312c. The resulting receiver circuit 1300 is robust and can tolerate variations in PVT and is immune to inter-symbol interference (ISI).

The one-to-one correlation between strong voltage level and its recovered wire state and the protocol-defined requirement to change wire state between each pair of consecutive UIs enables recovery of the receive clock signal 1310 from a transition in a single difference signal 1304a, 1304b, 1304c. The recovered receive clock signal 1310 is naturally reduced to half data rate and the need for an additional delay element can be eliminated from the clock recovery circuit. This provides additional reduced complexity and calibration requirements with respect to the programmable generator 1118 illustrated in FIG. 11 for example.

In some examples, the wire state 1308 output by CDR decision logic 1316 may be captured in a register used to represent current wire state. Current wire state may be compared with the wire state of the immediately preceding UI to generate a three bit FRP symbol 626 (see FIG. 6) representing change in wire state between UIs. In one example, a stream of symbols is provided to a serial-to-parallel converter that assembles groups of seven FRP symbols to be submitted to a decoder. In some examples, the receive clock signal 1310 may be further processed to control timing of symbol generation and decoding.

In some examples, the receiver circuit 1300 may include a termination circuit 1318 for the 3-wire C-PHY bus. In other examples, the termination circuit 1318 for the 3-wire C-PHY bus is provided externally.

Figure 15:
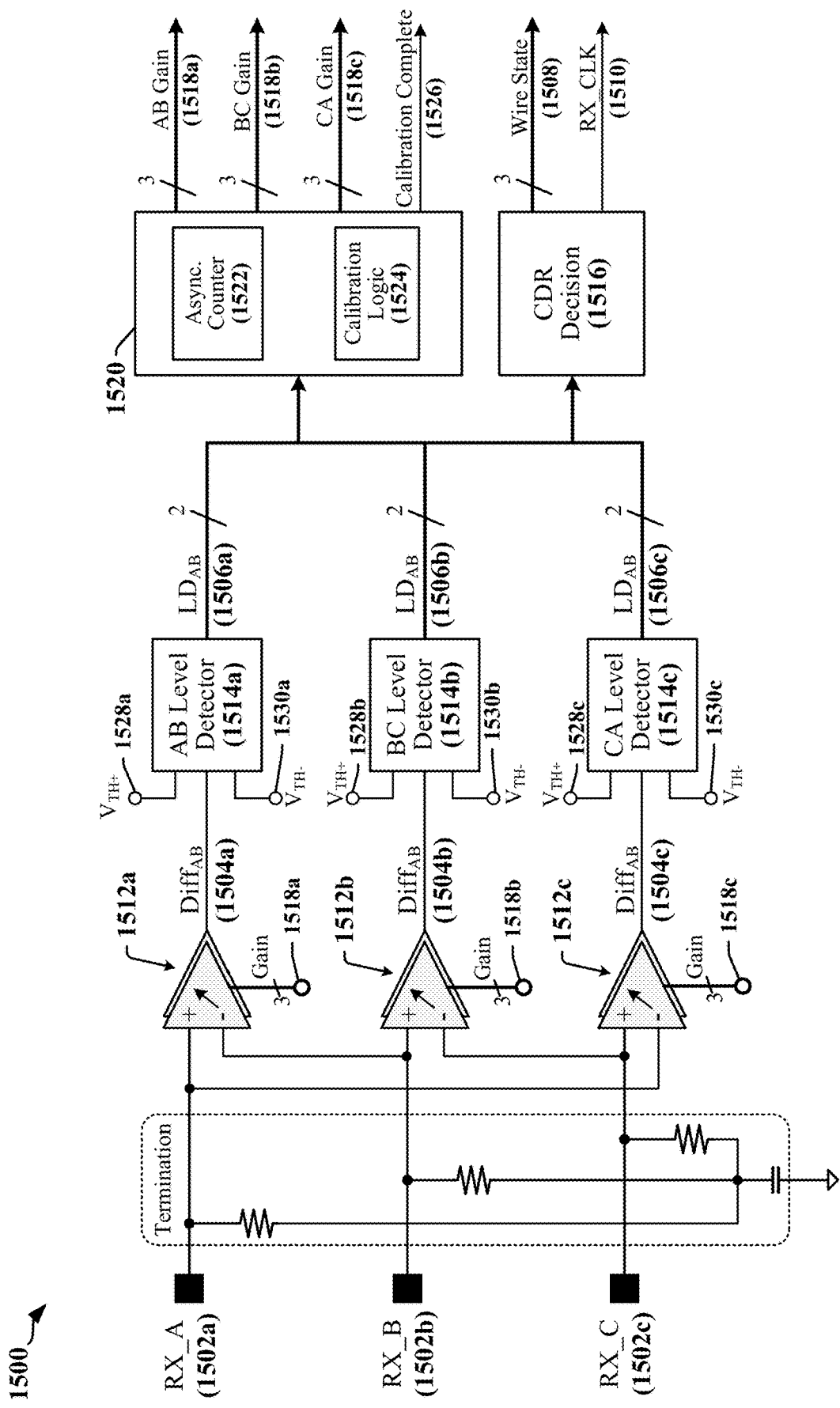
FIG. 15 illustrates a receiver circuit that includes a clock and data recovery circuit that includes a calibration circuit in accordance with certain aspects of the disclosure.

FIG. 15 illustrates a receiver circuit 1500 that includes a calibration circuit 1520 and that can perform clock and data recovery based on identification of the difference signal 1504*a*, 1504*b*, 1504*c* that produces the strong voltage level in a UI. In certain respects, the receiver circuit 1500 corresponds to the receiver circuit 1300 illustrated in FIG. 13. The difference signals 1504*a*, 1504*b*, 1504*c* are produced by three differential receivers 1512*a*, 1512*b*, 1512*c* configured to compare signal state on mutually different pairs of wires 1502*a*, 1502*b*, 1502*c*. An AB differential receiver 1512*a* compares the received states of the A wire 1502*a* and the B wire 1502*b*, a BC differential receiver 1512*b* compares the received states of the B wire 1502*b* and the C wire 1502*c* and a CA differential receiver 1512*c* compares the received states of the C wire 1502*c* and the A wire 1502*a*. In the illustrated example, each of the differential receivers 1512*a*, 1512*b*, 1512*c* includes one or more equalizing circuits. In one example, each of the differential receivers 1512*a*, 1512*b*, 1512*c* includes a CTLE and a VGA.

Each difference signal 1504*a*, 1504*b*, 1504*c* is provided to a level detector circuit 1514*a*, 1514*b*, 1514*c*. Each level detector circuit 1514*a*, 1514*b*, 1514*c* is configured to determine whether the voltage on the corresponding difference signal 1504*a*, 1504*b*, 1504*c* exceeds a positive threshold voltage level or is less than a negative threshold voltage level. In the one example, each level detector circuit 1514*a*, 1514*b*, 1514*c* outputs a two-bit LD signal (e.g., the LD signals 1506*a*, 1506*b*, 1506*c*) in which one bit indicates that the magnitude of the corresponding difference signal 1504*a*, 1504*b*, 1504*c* indicates a strong voltage level (e.g., 200 mV as opposed to 100 mV) and another bit indicates polarity of the corresponding difference signal 1504*a*, 1504*b*, 1504*c*. In another example, the LD signal 1506*a*, 1506*b*, 1506*c* output by each level detector circuit 1514*a*, 1514*b*, 1514*c* includes a first bit that indicates a strong positive difference when set high (or set low in some examples) and a second bit indicates a strong negative difference when set low. In the latter example, only one bit in the LD signal 1506*a*, 1506*b*, 1506*c* can be set high in any UI and both bits can be set low in one or more UIs.

The LD signals 1506*a*, 1506*b*, 1506*c* output by the level detector circuits 1514*a*, 1514*b*, 1514*c* are provided to CDR decision logic 1516 that is configured to generate a receive clock signal 1510 and a 3-bit wire state signal 1508 representing wire state for a current UI. In one example, the CDR decision logic 1516 is configured to select between 6 possible values for the wire state signal 1508. In one example, each LD signal 1506*a*, 1506*b*, 1506*c* includes a first bit that indicates a strong voltage level detected and a second bit that indicates polarity. Only one of the LD signals 1506*a*, 1506*b*, 1506*c* indicates a strong voltage level detected and this LD signal 1506*a*, 1506*b*, 1506*c* is used to select the value for the wire state signal 1508. In some examples, the CDR decision logic 1516 uses a lookup table indexed by the LD signals 1506*a*, 1506*b*, 1506*c* to select the 3-bit wire state signal 1508 output by the CDR decision logic 1516. In other examples, the 3-bit wire state signal 1508 output by the CDR decision logic 1516 is generated by combinational logic that receives as its input the LD signals 1506*a*, 1506*b*, 1506*c* generated by the level detector circuits 1514*a*, 1514*b*, 1514*c*.

In one aspect of this disclosure, the equalizing circuits in the differential receivers 1512*a*, 1512*b*, 1512*c* may be calibrated using a calibration circuit 1520 that includes one or more asynchronous counters 1522 and calibration logic 1524. In some examples, the calibration logic 1524 includes a processor, state machine and/or sequencing logic in addition to combination logic circuits. In some examples, the calibration procedure may be controlled by the calibration logic 1524 alone or in cooperation with a processing circuit in the receiving device. In one example, the calibration circuit 1520 may be enabled during a preamble transmitted over the trio, where the preamble generates a pattern of signaling states over a period of time. The pattern may be cyclic in some examples. The calibration circuit 1520 may be used to define, configure a CTLE coefficient and a VGA gain 1518*a*, 1518*b*, 1518*c* for each of the differential receivers 1512*a*, 1512*b*, 1512*c*. In some instances, the calibration circuit 1520 may configure one or more of the thresholds 1528*a*, 1528*b*, 1528*c*, 1530*a*, 1530*b*, 1530*c* used to determine strong voltage level in the difference signals 1504*a*, 1504*b*, 1504*c*.

In the illustrated example, calibration includes configuring a CTLE coefficient and a gain setting for a VGA in each of the differential receivers 1512*a*, 1512*b*, 1512*c*. The calibration may commence with low values for the CTLE coefficient and gain setting of the VGA. The asynchronous counters 1522 may be configured to count pulses or edges in the LD signals 1506*a*, 1506*b*, 1506*c* and the be counted and the calibration logic 1524 may be configured to compare the outputs of the asynchronous counters 1522 to a predefined threshold value over some interval to determine if the current gain setting is sufficient. Otherwise, the calibration logic may continue calibration by increasing the CTLE coefficient and VGA gain. When calibration has been accomplished, the calibration circuit 1520 may provide a signal 1526 indicating completion to a controller of the C-PHY interface.

Figure 16:
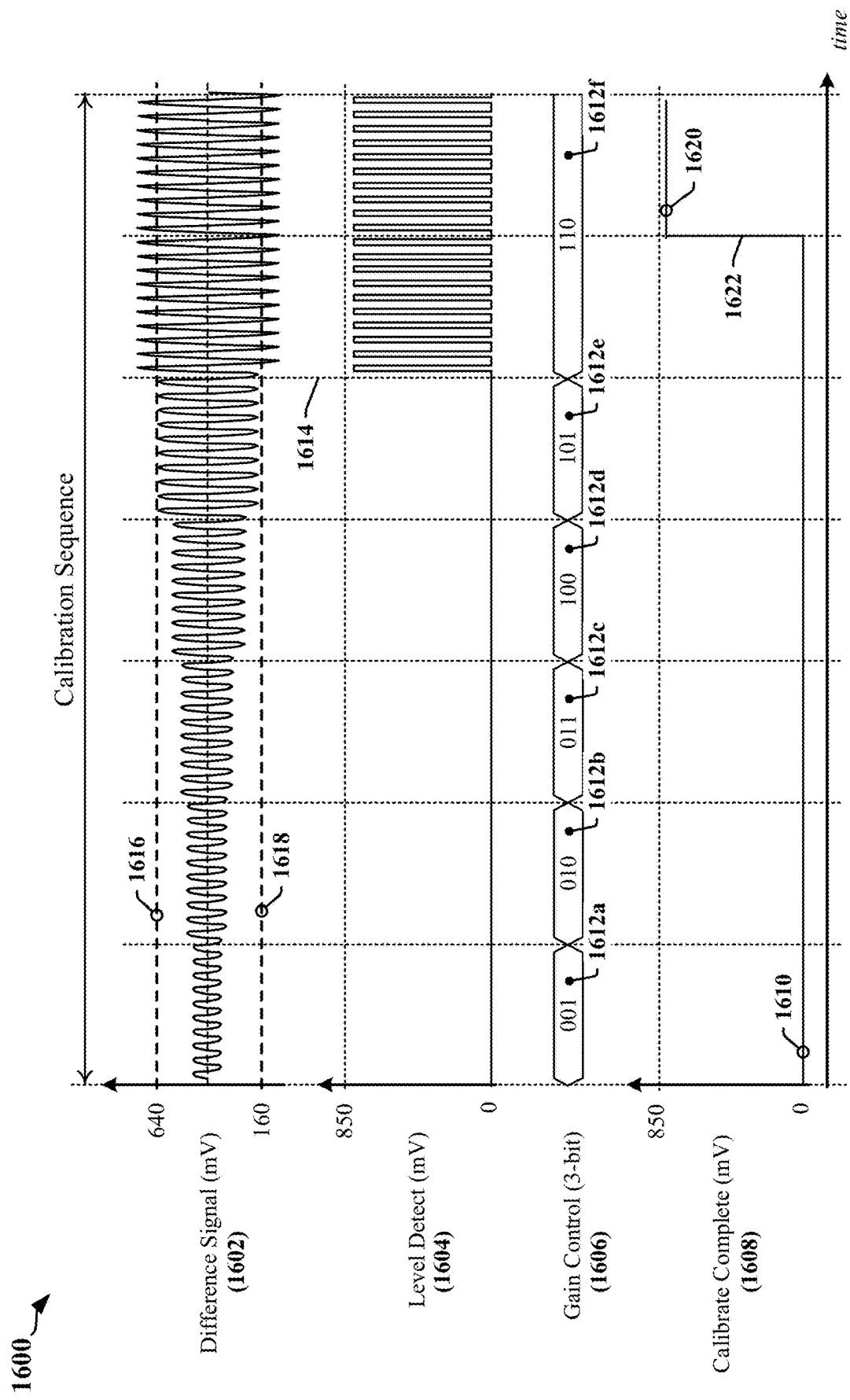
FIG. 16 illustrates a calibration sequence for an equalizing circuit in a differential receiver in accordance with certain aspects of this disclosure.

FIG. 16 is a timing diagram that illustrates a calibration sequence 1600 during which an equalizing circuit in a differential receiver may be calibrated in accordance with certain aspects of this disclosure. In one example, calibration is performed using the calibration circuit 1520 of FIG. 15, which includes one or more asynchronous counters 1522 and calibration logic 1524. In some examples, the calibration logic 1524 includes a processor, state machine and/or sequencing logic in addition to combination logic circuits. The calibration circuit 1520 may be enabled during a preamble transmitted over the trio, where the preamble generates a pattern of signaling states over a period of time. The pattern may be cyclic in some examples.

The illustrated timing diagram shows a difference signal 1602 produced by a differential receiver, a level detect signal 1604 that is responsive to the voltage level of the difference signal 1602 and gain control bits 1606 that are provided to an equalizing circuit in the differential receiver. The difference signal 1602 may correspond to one of the difference signals 1504*a*, 1504*b*, 1504*c* output by a differential receiver 1512*a*, 1512*b*, 1512*c*, and the level detect signal 1604 may be provided by a level detector circuit 1514*a*, 1514*b*, 1514*c* that is responsive to the difference signal 1602. The Calibrate Complete signal 1608 may be provided by the calibration circuit 1520 when calibration of each of the differential receivers 1512*a*, 1512*b*, 1512*c* is confirmed. In the illustrated timing diagram, the Calibrate Complete signal 1608 is initially at a voltage level 1610 corresponding to a logic low state.

The gain control bits 1606 may be initially set to a low or default level. In one example, the gain control bits 1606 may cause the equalizing circuit in the differential receiver to apply unity gain. In other examples, the gain control bits 1606 may be initialized to a level that is at or slightly below a previously calibrated gain setting. As illustrated, the gain control bits 1606 are set to an initial level (here 3'b001) in a first calibration step 1612a and incremented in each subsequent calibration step 1612b-1612f until calibration is achieved. The amplitude of the difference signal 1602 increases incrementally based on the gain level selected by the gain control bits 1606 until a change in the gain applied by the equalizing circuit after a transition 1614 between calibration steps 1612e-1612f causes the amplitude of the difference signal 1602 to exceed a configured or predefined threshold level 1616 or 1618. Transitions in amplitude across the threshold level 1616 or 1618 are indicated by transitions in the level detect signal 1604. A controller in a processing circuit that is monitoring the level detect signal 1604 may drive the Calibrate Complete signal 1608 to a voltage level 1620 corresponding to a logic high state to indicate end of the calibration process. The transition 1622 in the Calibrate Complete signal 1608 may be delayed with respect to the first detection of difference signal 1602 exceeding a configured or predefined threshold level 1616 or 1618. In some examples, the delay is provided to ensure that transients are not the cause of early termination of calibration. In some examples, the delay is provided ensure that all equalizing circuits in the differential receivers 1512a, 1512b, 1512c have been calibrated, while suppressing changes in gain control bits 1606 for calibrated equalizing circuits.

Examples of Processing Circuits and Methods

Figure 17:
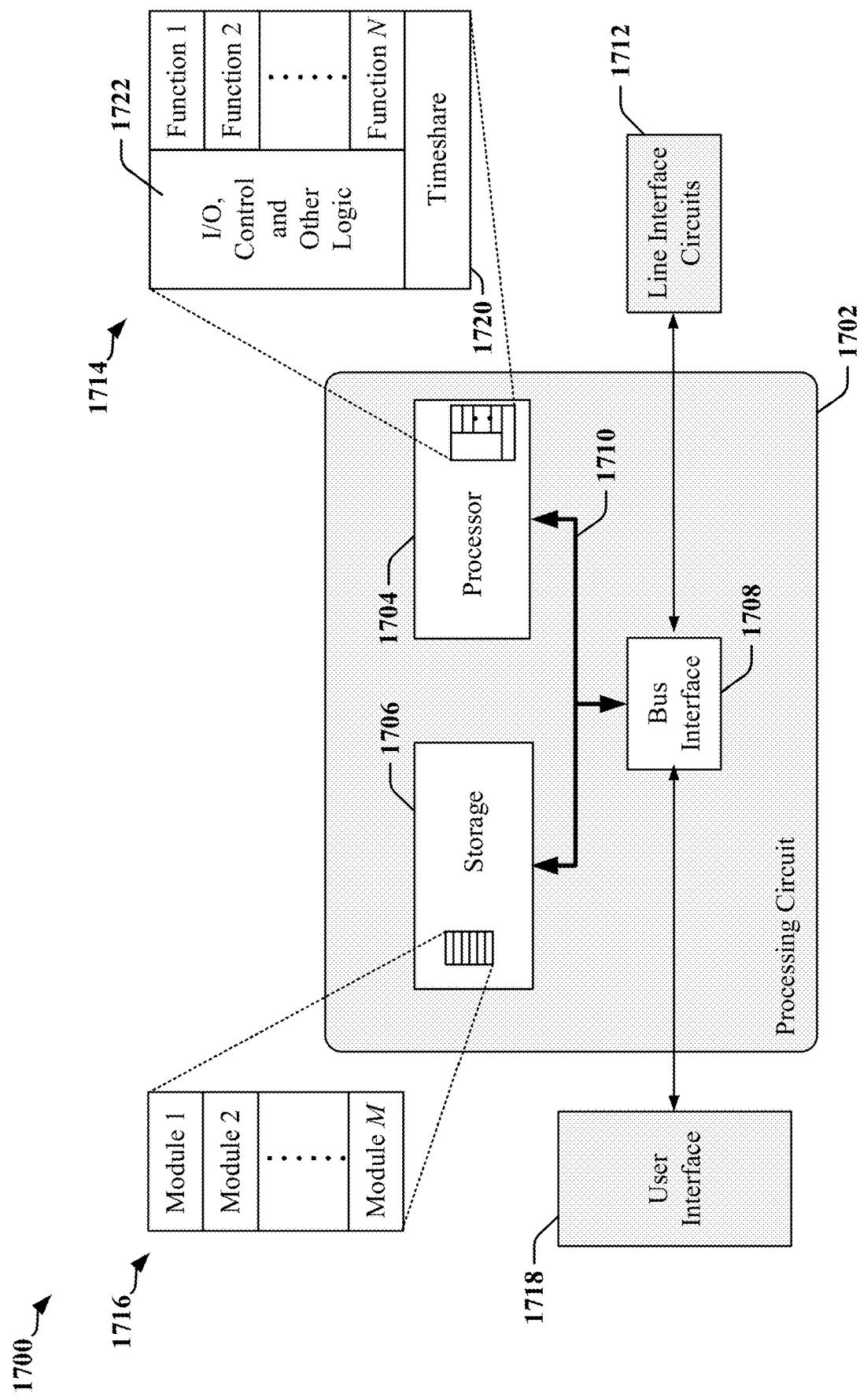
FIG. 17 is a block diagram illustrating an example of an apparatus employing a processing circuit that may be adapted according to certain aspects disclosed herein.

FIG. 17 illustrates an example of a hardware implementation for an apparatus 1700 employing a processing circuit 1702 that may be configured to perform one or more functions disclosed herein. In accordance with various aspects of the disclosure, an element, or any portion of an element, or any combination of elements as disclosed herein may be implemented using the processing circuit 1702. The processing circuit 1702 may include certain devices, circuits, and/or logic that support clock recovery techniques disclosed herein.

The processing circuit 1702 may include one or more processors 1704 that are controlled by some combination of hardware and software modules. Examples of processors 1704 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. In one example, the bus 1710 links together various circuits including the one or more processors 1704 and a processor-readable storage medium 1706. The processor-readable storage medium 1706 may include memory devices and mass storage devices and may be referred to herein as computer-readable media and/or processor-readable media. The bus 1710 may also link various other circuits such as timing sources, timers, peripherals, voltage regulators, and power management circuits. A bus interface 1708 may provide an interface between the bus 1710 and one or more transceivers 1712. A transceiver 1712 may be provided for each networking technology supported by the processing circuit. In some instances, multiple networking technologies may share some or all of the circuitry or processing modules found in a transceiver 1712. Each transceiver 1712 provides a means for communicating with various other apparatus over a transmission medium. Depending upon the nature of the apparatus 1700, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a computer-readable medium, which may include the processor-readable storage medium 1706. In this respect, the processing circuit 1702, including the processor 1704, may be used to implement any of the methods, functions and techniques disclosed herein. The processor-readable storage medium 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the processor-readable storage medium 1706 or in another external processor-readable medium. The processor-readable storage medium 1706 may include a non-transitory computer-readable medium. A non-transitory processor-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The processor-readable storage medium 1706 may also include, by way of example, a carrier wave, a transmission line, and any other suitable medium for transmitting software and/or instructions that may be accessed and read by a computer. The processor-readable storage medium 1706 may reside in the processing circuit 1702, in the processor 1704, external to the processing circuit 1702, or be distributed across multiple entities including the processing circuit 1702. The processor-readable storage medium 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The processor-readable storage medium 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as the transceiver 1712, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to the transceiver 1712, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Figure 18:
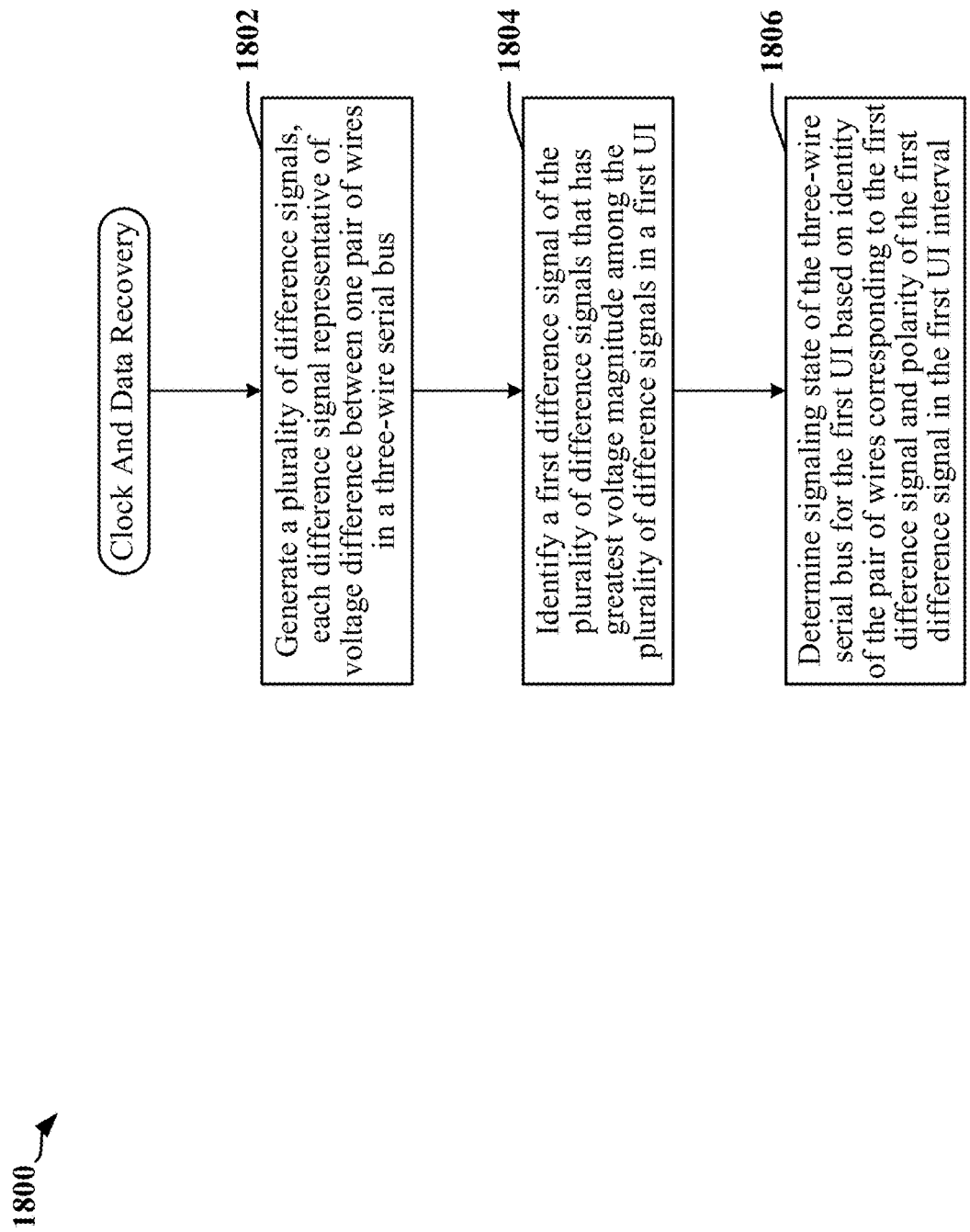
FIG. 18 is a flowchart of a first method of calibration according to certain aspects disclosed herein.

FIG. 18 is a flowchart 1800 of a method of data communications. The method may be performed at a receiving device coupled to a three-wire serial bus. In one example, the three-wire serial bus may be operated in accordance with a C-PHY protocol. At block 1802, the receiving device may generate a plurality of difference signals. Each difference signal may be representative of voltage difference between one pair of wires in a three-wire serial bus. Three difference signals may be generated in the example of a serial bus operated in accordance with a C-PHY protocol. Denoting the voltages on the wires of the three-wire serial bus as $V_A$, $V_B$ and $V_C$, the difference signals may represent the voltage difference $V_A-V_B$, $V_B-V_C$, and $V_C-V_A$.

At block 1804, the receiving device may identify a first difference signal of the plurality of difference signals that has greatest voltage magnitude among the plurality of difference signals in a first UI. In one example, the first UI is one of a sequence of consecutive UIs that and data may be encoded in signaling state transitions between successive UIs. At block 1806, the receiving device may determine signaling state of the three-wire serial bus for the first UI based on identity of the pair of wires corresponding to the first difference signal and polarity of the first difference signal in the first UI.

In certain aspects, the receiving device may generate a first edge in a clock signal responsive to a transition in the first difference signal during the first UI. The receiving device may capture signaling state of a sequence of consecutive UIs in accordance with timing provided by the clock signal. The receiving device may decode data from signaling state transitions between successive UIs in the sequence of consecutive UIs. The receiving device may identify a second difference signal of the plurality of difference signals that has greatest magnitude of voltage among the plurality of difference signals in a second UI. The second difference signal may be different from the first difference signal. The receiving device may determine signaling state of the three-wire serial bus for the second UI based on identity of the pair of wires corresponding to the second difference signal and polarity of the second difference signal in the second UI. The receiving device may generate a second edge in the clock signal responsive to a transition in the second difference signal, the first edge and the second edge including a rising edge and a falling edge. The first edge immediately precedes the second edge in the clock signal.

In some examples, the receiving device may determine that the first difference signal has the greatest voltage magnitude among the plurality of difference signals in the first UI when the first difference signal has a voltage level that is greater than a first threshold voltage or less than a second threshold voltage. The receiving device may determine that the first difference signal has a positive polarity when voltage of the first difference signal is greater than the first threshold voltage. The receiving device may determine that the first difference signal has a negative polarity when voltage of the first difference signal is less than the second threshold voltage.

In some examples, the receiving device may count a number of UIs in which the first difference signal is identified that has the greatest voltage magnitude among the plurality of difference signals while a C-PHY preamble is transmitted over the three-wire serial bus. The receiving device may calibrate an equalization circuit in a differential receiver used to generate the first difference signal based on the number of unit intervals of the C-PHY preamble in which the first difference signal has the greatest voltage magnitude.

Figure 19:
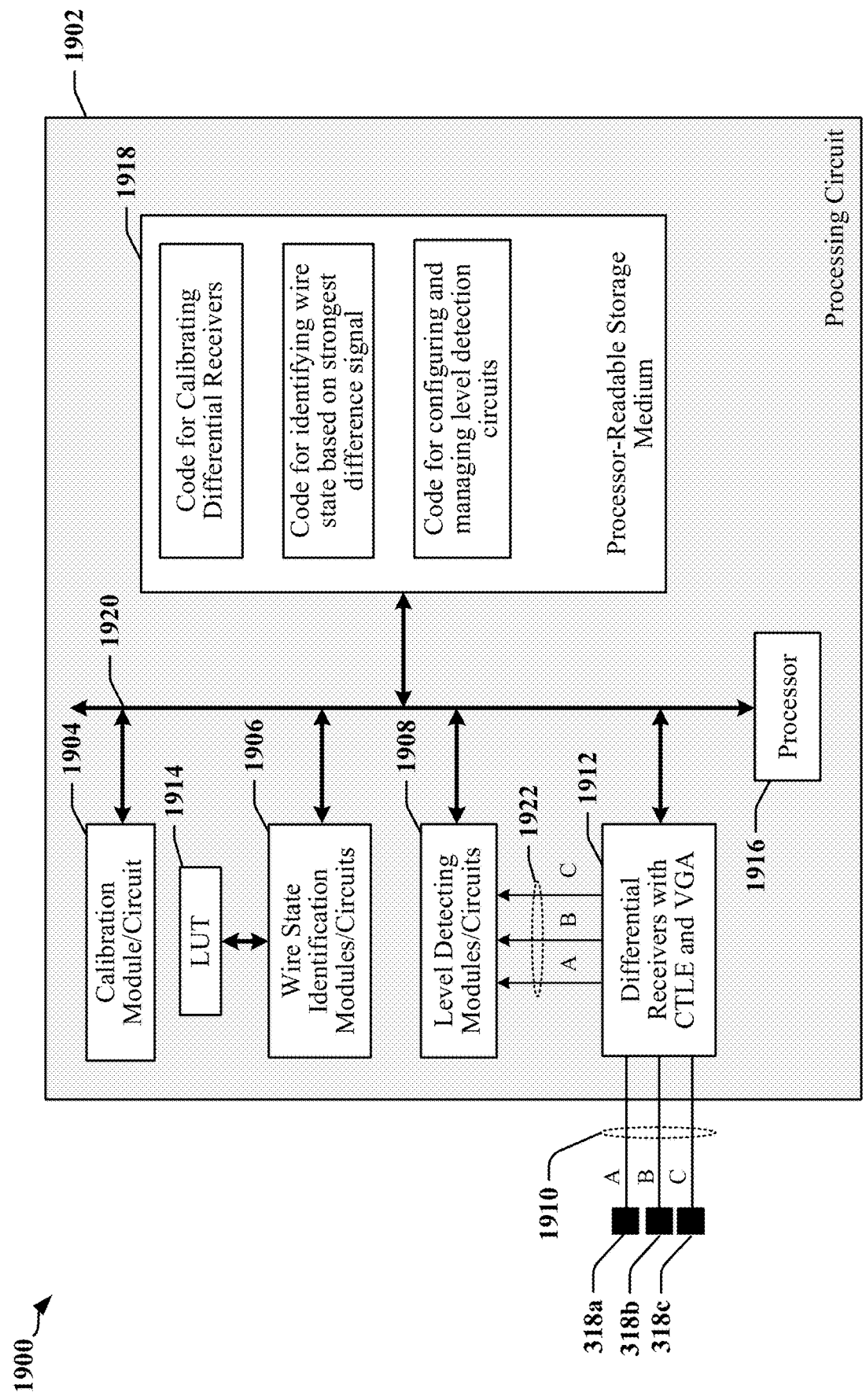
FIG. 19 is a diagram illustrating a first example of a hardware implementation for an apparatus employing a processing employing a processing circuit adapted according to certain aspects disclosed herein.

FIG. 19 is a diagram illustrating an example of a hardware implementation for an apparatus 1900 employing a processing circuit 1902. The processing circuit 1902 typically has at least one processor 1916 that may include a microprocessor, microcontroller, digital signal processor, a sequencer or a state machine. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the processor 1916, the modules or circuits 1904, 1906 and 1908, differential receivers 1912 and the processor-readable storage medium 1918. The bus 1920 may also link various other circuits such as timing sources, peripherals, voltage regulators, and power management circuits, which are well known in the art, and therefore, will not be described any further.

The processor 1916 is responsible for general processing, including the execution of software stored on the processor-readable storage medium 1918. The software, when executed by the processor 1916, causes the processing circuit 1902 to perform the various functions described supra for any particular apparatus. The processor-readable storage medium 1918 may also be used for storing data that is manipulated by the processor 1916 when executing software, including data decoded from symbols transmitted over the connectors or wires 1910, which may be configured as a C-PHY bus. The processing circuit 1902 further includes at least one of the modules 1904, 1906 and 1908. The modules 1904, 1906 and 1908 may be software modules running in the processor 1916, resident/stored in the processor-readable storage medium 1918, one or more hardware modules coupled to the processor 1916, or some combination thereof. The modules 1904, 1906 and/or 1908 may include microcontroller instructions, state machine configuration parameters, or some combination thereof. The processing circuit 1902 further includes differential receivers 1912 that generate difference signals 1922 representative of differences in signaling state between different pairs of the connectors or wires 1910. The processing circuit 1902 may include a look up table 1914, which may be implemented in the storage medium 1918 or separately from the storage medium 1918.

In one configuration, the apparatus 1900 may be configured to receive data communicated in accordance with a C-PHY protocol. The apparatus 1900 may include modules and/or circuits 1908 configured to determine voltage magnitude and polarity of the difference signals 1922 and to detect a first difference signal that has a magnitude greater than the other difference signals. The apparatus 1900 may include modules and/or circuits 1906 that are configured to determine signaling state of the connectors or wires 1910 for a first UI based on identity of the pair of wires corresponding to the first difference signal and polarity of the first difference signal in the first UI. The apparatus 1900 may include modules and/or circuits 1904 for calibrating equalizing circuits in the differential receivers 1912. For example, the equalizing circuits may be calibrated based on the number of UIs of a C-PHY preamble in which the first difference signal has the greatest voltage magnitude.

In one example, the apparatus 1900 has a plurality of differential receivers 1912 configured to generate a plurality of difference signals 1922. Each of the plurality of difference signals 1922 is representative of voltage difference between one pair of wires in a three-wire serial bus coupled to the connectors or wires 1910. The apparatus 1900 has a recovery circuit configured to identify a first difference signal that has greatest voltage magnitude among the plurality of difference signals in a first UI, and determine signaling state of the three-wire serial bus for the first UI based on identity of the pair of wires corresponding to the first difference signal and polarity of the first difference signal in the first UI.

In some examples, the recovery circuit is further configured to generate a first edge in a clock signal responsive to a transition in the first difference signal during the first UI. The apparatus 1900 may have a decoding circuit configured to capture signaling state of a sequence of consecutive UIs in accordance with timing provided by the clock signal, and decode data from signaling state transitions between successive UIs in the sequence of consecutive UIs. The recovery circuit may be further configured to identify a second difference signal of the plurality of difference signals that has greatest magnitude of voltage among the plurality of difference signals in a second UI. The second difference signal is different from the first difference signal. e recovery circuit may be further configured to determine signaling state of the three-wire serial bus for the second UI based on identity of the pair of wires corresponding to the second difference signal and polarity of the second difference signal in the second UI. The recovery circuit may be further configured to generate a second edge in the clock signal responsive to a transition in the second difference signal, the first edge and the second edge including a rising edge and a falling edge. The first edge immediately precedes the second edge in the clock signal.

The apparatus 1900 may have a plurality of level detectors. A first level detector may be configured to determine that the first difference signal has the greatest voltage magnitude among the plurality of difference signals in the first UI when the first difference signal has a voltage level that is greater than a first threshold voltage or less than a second threshold voltage. The first level detector may be further configured to determine that the first difference signal has a positive polarity when voltage of the first difference signal is greater than the first threshold voltage, and determine that the first difference signal has a negative polarity when voltage of the first difference signal is less than the second threshold voltage.

The apparatus 1900 may have a calibration circuit configured to count a number of UIs in which the first difference signal is identified that has the greatest voltage magnitude among the plurality of difference signals while a C-PHY preamble is transmitted over the three-wire serial bus and calibrate an equalizer in a differential receiver used to generate the first difference signal based on the number of UIs counted during transmission of the C-PHY preamble.

The processor-readable storage medium 1918 may be a non-transitory storage medium and may store instructions or code that, when executed a processor 1916, cause the processing circuit 1902 to generate a plurality of difference signals, each difference signal representative of voltage difference between one pair of wires in a three-wire serial bus, identify a first difference signal of the plurality of difference signals that has greatest voltage magnitude among the plurality of difference signals in a first unit interval, and determine signaling state of the three-wire serial bus for the first unit interval based on identity of the pair of wires corresponding to the first difference signal and polarity of the first difference signal in the first unit interval.

In some examples, the instructions or code may further cause the processing circuit 1902 to generate a first edge in a clock signal responsive to a transition in the first difference signal during the first unit interval. The instructions or code may further cause the processing circuit 1902 to capture signaling state of a sequence of consecutive unit intervals in accordance with timing provided by the clock signal, and decode data from signaling state transitions between successive unit intervals in the sequence of consecutive unit intervals. The instructions or code may further cause the processing circuit 1902 to identify a second difference signal of the plurality of difference signals that has greatest magnitude of voltage among the plurality of difference signals in a second unit interval and determine signaling state of the three-wire serial bus for the second unit interval based on identity of the pair of wires corresponding to the second difference signal and polarity of the second difference signal in the second unit interval. The second difference signal is different from the first difference signal. The instructions or code may further cause the processing circuit 1902 to generate a second edge in the clock signal responsive to a transition in the second difference signal, the first edge and the second edge including a rising edge and a falling edge. The first edge immediately precedes the second edge in the clock signal.

In some examples, the instructions or code may further cause the processing circuit 1902 to determine that the first difference signal has the greatest voltage magnitude among the plurality of difference signals in the first unit interval when the first difference signal has a voltage level that is greater than a first threshold voltage or less than a second threshold voltage. The instructions or code may further cause the processing circuit 1902 to determine that the first difference signal has a positive polarity when voltage of the first difference signal is greater than the first threshold voltage, and determine that the first difference signal has a negative polarity when voltage of the first difference signal is less than the second threshold voltage.

In some examples, the instructions or code may further cause the processing circuit 1902 to count a number of unit intervals in which the first difference signal is identified that has the greatest voltage magnitude among the plurality of difference signals while a C-PHY preamble is transmitted over the three-wire serial bus, and calibrate an equalizer in a differential receiver used to generate the first difference signal based on the number of unit intervals in which the first difference signal is identified that has the greatest voltage magnitude counted during transmission of the C-PHY preamble.

Some implementation examples are described in the following numbered clauses:
1. A method of data communications, comprising: generating a plurality of difference signals, each difference signal representative of voltage difference between one pair of wires in a three-wire serial bus; identifying a first difference signal of the plurality of difference signals that has greatest voltage magnitude among the plurality of difference signals in a first unit interval; and determining signaling state of the three-wire serial bus for the first unit interval based on identity of the pair of wires corresponding to the first difference signal and polarity of the first difference signal in the first unit interval.
2. The method as described in clause 1, further comprising generating a first edge in a clock signal responsive to a transition in the first difference signal during the first unit interval.
3. The method of clause 2, further comprising capturing signaling state of a sequence of consecutive unit intervals in accordance with timing provided by the clock signal; and decoding data from signaling state transitions between successive unit intervals in the sequence of consecutive unit intervals.
4. The method as described in clause 2 or clause 3, further comprising identifying a second difference signal of the plurality of difference signals that has greatest magnitude of voltage among the plurality of difference signals in a second unit interval, wherein the second difference signal is different from the first difference signal; and determining signaling state of the three-wire serial bus for the second unit interval based on identity of the pair of wires corresponding to the second difference signal and polarity of the second difference signal in the second unit interval.
5. The method as described in clause 4, further comprising generating a second edge in the clock signal responsive to a transition in the second difference signal, the first edge and the second edge including a rising edge and a falling edge.
6. The method as described in clause 5, wherein the first edge immediately precedes the second edge in the clock signal.
7. The method as described in any of clauses 1-6, further comprising determining that the first difference signal has the greatest voltage magnitude among the plurality of difference signals in the first unit interval when the first difference signal has a voltage level that is greater than a first threshold voltage or less than a second threshold voltage.
8. The method as described in clause 7, further comprising determining that the first difference signal has a positive polarity when voltage of the first difference signal is greater than the first threshold voltage; and determining that the first difference signal has a negative polarity when voltage of the first difference signal is less than the second threshold voltage.
9. The method as described in any of clauses 1-8, further comprising counting a number of unit intervals in which the first difference signal is identified that has the greatest voltage magnitude among the plurality of difference signals while a C-PHY preamble is transmitted over the three-wire serial bus; and calibrating an equalization circuit in a differential receiver used to generate the first difference signal based on the number of unit intervals of the C-PHY preamble in which the first difference signal has the greatest voltage magnitude.
10. An apparatus for data communication, comprising a plurality of differential receivers configured to generate a plurality of difference signals, each difference signal representative of voltage difference between one pair of wires in a three-wire serial bus; and a recovery circuit configured to: identify a first difference signal that has greatest voltage magnitude among the plurality of difference signals in a first unit interval; and determine signaling state of the three-wire serial bus for the first unit interval based on identity of the pair of wires corresponding to the first difference signal and polarity of the first difference signal in the first unit interval.
11. The apparatus as described in clause 10, wherein the recovery circuit is further configured to generate a first edge in a clock signal responsive to a transition in the first difference signal during the first unit interval.
12. The apparatus as described in clause 11, further comprising a decoding circuit configured to: capture signaling state of a sequence of consecutive unit intervals in accordance with timing provided by the clock signal; and decode data from signaling state transitions between successive unit intervals in the sequence of consecutive unit intervals.

13. The apparatus as described in clause 11 or clause 12, wherein the recovery circuit is further configured to identify a second difference signal of the plurality of difference signals that has greatest magnitude of voltage among the plurality of difference signals in a second unit interval, wherein the second difference signal is different from the first difference signal; and determine signaling state of the three-wire serial bus for the second unit interval based on identity of the pair of wires corresponding to the second difference signal and polarity of the second difference signal in the second unit interval.

14. The apparatus as described in clause 13, wherein the recovery circuit is further configured to generate a second edge in the clock signal responsive to a transition in the second difference signal, the first edge and the second edge including a rising edge and a falling edge.

15. The apparatus as described in clause 14, wherein the first edge immediately precedes the second edge in the clock signal.

16. The apparatus as described any of clauses 10-15, further comprising a plurality of level detectors, wherein a first level detector is configured to determine that the first difference signal has the greatest voltage magnitude among the plurality of difference signals in the first unit interval when the first difference signal has a voltage level that is greater than a first threshold voltage or less than a second threshold voltage.

17. The apparatus as described in clause 16, wherein the first level detector is further configured to determine that the first difference signal has a positive polarity when voltage of the first difference signal is greater than the first threshold voltage; and determine that the first difference signal has a negative polarity when voltage of the first difference signal is less than the second threshold voltage.

18. The apparatus as described any of clauses 10-17, further comprising a calibration circuit configured to count a number of unit intervals in which the first difference signal is identified that has the greatest voltage magnitude among the plurality of difference signals while a C-PHY preamble is transmitted over the three-wire serial bus; and calibrate an equalization circuit in a differential receiver used to generate the first difference signal based on the number of unit intervals of the C-PHY preamble in which the first difference signal has the greatest voltage magnitude.

19. A non-transitory processor readable storage medium, comprising code for generating a plurality of difference signals, each difference signal representative of voltage difference between one pair of wires in a three-wire serial bus; identifying a first difference signal of the plurality of difference signals that has greatest voltage magnitude among the plurality of difference signals in a first unit interval; and determining signaling state of the three-wire serial bus for the first unit interval based on identity of the pair of wires corresponding to the first difference signal and polarity of the first difference signal in the first unit interval.

20. The storage medium as described in clause 19, further comprising generating a first edge in a clock signal responsive to a transition in the first difference signal during the first unit interval.

21. The storage medium as described in clause 20, further comprising capturing signaling state of a sequence of consecutive unit intervals in accordance with timing provided by the clock signal; and decoding data from signaling state transitions between successive unit intervals in the sequence of consecutive unit intervals.

22. The storage medium as described in clause 20 or clause 21, further comprising identifying a second difference signal of the plurality of difference signals that has greatest magnitude of voltage among the plurality of difference signals in a second unit interval, wherein the second difference signal is different from the first difference signal; and determining signaling state of the three-wire serial bus for the second unit interval based on identity of the pair of wires corresponding to the second difference signal and polarity of the second difference signal in the second unit interval.

23. The storage medium as described in clause 22, further comprising generating a second edge in the clock signal responsive to a transition in the second difference signal, the first edge and the second edge including a rising edge and a falling edge.

24. The storage medium as described in clause 23, wherein the first edge immediately precedes the second edge in the clock signal.

25. The storage medium as described any of clauses 19-24, further comprising determining that the first difference signal has the greatest voltage magnitude among the plurality of difference signals in the first unit interval when the first difference signal has a voltage level that is greater than a first threshold voltage or less than a second threshold voltage.

26. The storage medium as described in clause 25, further comprising determining that the first difference signal has a positive polarity when voltage of the first difference signal is greater than the first threshold voltage; and determining that the first difference signal has a negative polarity when voltage of the first difference signal is less than the second threshold voltage.

27. The storage medium as described any of clauses 19,-26 further comprising counting a number of unit intervals in which the first difference signal is identified that has the greatest voltage magnitude among the plurality of difference signals while a C-PHY preamble is transmitted over the three-wire serial bus; and calibrating an equalization circuit in a differential receiver used to generate the first difference signal based on the number of unit intervals of the C-PHY preamble in which the first difference signal has the greatest voltage magnitude.

28. An apparatus for decoding data transmitted on a 3-wire 3-phase interface, comprising means for generating a plurality of difference signals, each difference signal representative of voltage difference between one pair of wires in a three-wire serial bus; means for identifying a first difference signal of the plurality of difference signals that has greatest voltage magnitude among the plurality of difference signals in a first unit interval; and means for determining signaling state of the three-wire serial bus for the first unit interval based on identity of the pair of wires corresponding to the first difference signal and polarity of the first difference signal in the first unit interval.

29. The apparatus as described in clause 28, further comprising means for generating a first edge in a clock signal responsive to a transition in the first difference signal during the first unit interval.

30. The apparatus as described in clause 29, further comprising means for capturing signaling state of a sequence of consecutive unit intervals in accordance with timing provided by the clock signal; and means for decoding data from signaling state transitions between successive unit intervals in the sequence of consecutive unit intervals.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communications, comprising:
generating a plurality of difference signals, each difference signal representative of voltage difference between one pair of wires in a three-wire serial bus;
identifying a first difference signal of the plurality of difference signals that has greatest voltage magnitude among the plurality of difference signals in a first unit interval; and
determining signaling state of the three-wire serial bus for the first unit interval based on identity of the pair of wires corresponding to the first difference signal and polarity of the first difference signal in the first unit interval.

2. The method of claim 1, further comprising:
generating a first edge in a clock signal responsive to a transition in the first difference signal during the first unit interval.

3. The method of claim 2, further comprising:
capturing signaling state of a sequence of consecutive unit intervals in accordance with timing provided by the clock signal; and
decoding data from signaling state transitions between successive unit intervals in the sequence of consecutive unit intervals.

4. The method of claim 2, further comprising:
identifying a second difference signal of the plurality of difference signals that has greatest magnitude of voltage among the plurality of difference signals in a second unit interval, wherein the second difference signal is different from the first difference signal; and
determining signaling state of the three-wire serial bus for the second unit interval based on identity of the pair of wires corresponding to the second difference signal and polarity of the second difference signal in the second unit interval.

5. The method of claim 4, further comprising:
generating a second edge in the clock signal responsive to a transition in the second difference signal, the first edge and the second edge including a rising edge and a falling edge.

6. The method of claim 5, wherein the first edge immediately precedes the second edge in the clock signal.

7. The method of claim 1, further comprising:
determining that the first difference signal has the greatest voltage magnitude among the plurality of difference signals in the first unit interval when the first difference signal has a voltage level that is greater than a first threshold voltage or less than a second threshold voltage.

8. The method of claim 7, further comprising:
determining that the first difference signal has a positive polarity when voltage of the first difference signal is greater than the first threshold voltage; and
determining that the first difference signal has a negative polarity when voltage of the first difference signal is less than the second threshold voltage.

9. The method of claim 1, further comprising:
counting a number of unit intervals in which the first difference signal is identified that has the greatest voltage magnitude among the plurality of difference signals while a C-PHY preamble is transmitted over the three-wire serial bus; and
calibrating an equalization circuit in a differential receiver used to generate the first difference signal based on the number of unit intervals of the C-PHY preamble in which the first difference signal has the greatest voltage magnitude.

10. An apparatus for data communication, comprising:
a plurality of differential receivers configured to generate a plurality of difference signals, each difference signal representative of voltage difference between one pair of wires in a three-wire serial bus; and
a recovery circuit configured to:
identify a first difference signal that has greatest voltage magnitude among the plurality of difference signals in a first unit interval; and
determine signaling state of the three-wire serial bus for the first unit interval based on identity of the pair of wires corresponding to the first difference signal and polarity of the first difference signal in the first unit interval.

11. The apparatus of claim 10, wherein the recovery circuit is further configured to:
generate a first edge in a clock signal responsive to a transition in the first difference signal during the first unit interval.

12. The apparatus of claim 11, further comprising a decoding circuit configured to:
capture signaling state of a sequence of consecutive unit intervals in accordance with timing provided by the clock signal; and
decode data from signaling state transitions between successive unit intervals in the sequence of consecutive unit intervals.

13. The apparatus of claim 11, wherein the recovery circuit is further configured to:
identify a second difference signal of the plurality of difference signals that has greatest magnitude of voltage among the plurality of difference signals in a second unit interval, wherein the second difference signal is different from the first difference signal; and determine signaling state of the three-wire serial bus for the second unit interval based on identity of the pair of wires corresponding to the second difference signal and polarity of the second difference signal in the second unit interval.

14. The apparatus of claim 13, wherein the recovery circuit is further configured to:
generate a second edge in the clock signal responsive to a transition in the second difference signal, the first edge and the second edge including a rising edge and a falling edge.

15. The apparatus of claim 14, wherein the first edge immediately precedes the second edge in the clock signal.

16. The apparatus of claim 10, further comprising:
a plurality of level detectors, wherein a first level detector is configured to determine that the first difference signal has the greatest voltage magnitude among the plurality of difference signals in the first unit interval when the first difference signal has a voltage level that is greater than a first threshold voltage or less than a second threshold voltage.

17. The apparatus of claim 16, wherein the first level detector is further configured to:
determine that the first difference signal has a positive polarity when voltage of the first difference signal is greater than the first threshold voltage; and
determine that the first difference signal has a negative polarity when voltage of the first difference signal is less than the second threshold voltage.

18. The apparatus of claim 10, further comprising a calibration circuit configured to:
count a number of unit intervals in which the first difference signal is identified that has the greatest voltage magnitude among the plurality of difference signals while a C-PHY preamble is transmitted over the three-wire serial bus; and
calibrate an equalization circuit in a differential receiver used to generate the first difference signal based on the number of unit intervals of the C-PHY preamble in which the first difference signal has the greatest voltage magnitude.

19. A non-transitory processor readable storage medium, comprising code that, when executed by one or more processors, causes the one or more processors to:
generate a plurality of difference signals, each difference signal representative of voltage difference between one pair of wires in a three-wire serial bus;
identify a first difference signal of the plurality of difference signals that has greatest voltage magnitude among the plurality of difference signals in a first unit interval; and
determine signaling state of the three-wire serial bus for the first unit interval based on identity of the pair of wires corresponding to the first difference signal and polarity of the first difference signal in the first unit interval.

20. The storage medium of claim 19, further comprising code for that causes the one or more processors to:
generate a first edge in a clock signal responsive to a transition in the first difference signal during the first unit interval.

21. The storage medium of claim 20, further comprising code that causes the one or more processors to:

capture signaling state of a sequence of consecutive unit intervals in accordance with timing provided by the clock signal; and
decode data from signaling state transitions between successive unit intervals in the sequence of consecutive unit intervals.

22. The storage medium of claim 20, further comprising code for that causes the one or more processors to:
identify a second difference signal of the plurality of difference signals that has greatest magnitude of voltage among the plurality of difference signals in a second unit interval, wherein the second difference signal is different from the first difference signal; and
determine signaling state of the three-wire serial bus for the second unit interval based on identity of the pair of wires corresponding to the second difference signal and polarity of the second difference signal in the second unit interval.

23. The storage medium of claim 22, further comprising code for that causes the one or more processors to:
generate a second edge in the clock signal responsive to a transition in the second difference signal, the first edge and the second edge including a rising edge and a falling edge.

24. The storage medium of claim 23, wherein the first edge immediately precedes the second edge in the clock signal.

25. The storage medium of claim 19, further comprising code for that causes the one or more processors to:
determine that the first difference signal has the greatest voltage magnitude among the plurality of difference signals in the first unit interval when the first difference signal has a voltage level that is greater than a first threshold voltage or less than a second threshold voltage.

26. The storage medium of claim 25, further comprising code for that causes the one or more processors to:
determine that the first difference signal has a positive polarity when voltage of the first difference signal is greater than the first threshold voltage; and
determine that the first difference signal has a negative polarity when voltage of the first difference signal is less than the second threshold voltage.

27. The storage medium of claim 19, further comprising code for that causes the one or more processors to:
count a number of unit intervals in which the first difference signal is identified that has the greatest voltage magnitude among the plurality of difference signals while a C-PHY preamble is transmitted over the three-wire serial bus; and
calibrate an equalization circuit in a differential receiver used to generate the first difference signal based on the number of unit intervals of the C-PHY preamble in which the first difference signal has the greatest voltage magnitude.

28. An apparatus for decoding data transmitted on a 3-wire 3-phase interface, comprising:
means for generating a plurality of difference signals, each difference signal representative of voltage difference between one pair of wires in a three-wire serial bus;
means for identifying a first difference signal of the plurality of difference signals that has greatest voltage magnitude among the plurality of difference signals in a first unit interval; and
means for determining signaling state of the three-wire serial bus for the first unit interval based on identity of the pair of wires corresponding to the first difference signal and polarity of the first difference signal in the first unit interval.

29. The apparatus of claim 28, further comprising:
means for generating a first edge in a clock signal responsive to a transition in the first difference signal during the first unit interval.

30. The apparatus of claim 29, further comprising:
means for capturing signaling state of a sequence of consecutive unit intervals in accordance with timing provided by the clock signal; and
means for decoding data from signaling state transitions between successive unit intervals in the sequence of consecutive unit intervals.

* * * * *